United States Patent
Alstad et al.

(10) Patent No.: US 10,731,566 B2
(45) Date of Patent: Aug. 4, 2020

(54) COMPACT ACCESSORY SYSTEMS FOR A GAS TURBINE ENGINE

(71) Applicant: HONEYWELL INTERNATIONAL INC., Morris Plains, NJ (US)

(72) Inventors: Shawn Alstad, Phoenix, AZ (US);
Tomasz Dobosz, Tempe, AZ (US);
Rocio Chavez Felix, Baja California (MX)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 367 days.

(21) Appl. No.: 15/786,733

(22) Filed: Oct. 18, 2017

(65) Prior Publication Data
US 2019/0112984 A1 Apr. 18, 2019

(51) Int. Cl.
*F02C 7/32* (2006.01)
*F16H 1/22* (2006.01)
*F01D 25/16* (2006.01)
*F16H 55/20* (2006.01)

(52) U.S. Cl.
CPC .............. *F02C 7/32* (2013.01); *F01D 25/162* (2013.01); *F16H 1/222* (2013.01); *F16H 55/20* (2013.01); *F05D 2230/644* (2013.01); *F05D 2240/50* (2013.01); *F05D 2250/312* (2013.01); *F05D 2250/313* (2013.01); *F05D 2250/314* (2013.01); *F05D 2260/4031* (2013.01); *F05D 2260/532* (2013.01)

(58) Field of Classification Search
CPC .............. F02C 7/32; F02C 7/36; F16H 1/222
See application file for complete search history.

(56) References Cited

U.S. PATENT DOCUMENTS

| 3,638,421 A | * | 2/1972 | Chilman | ................. F02C 7/20 60/797 |
| 3,826,151 A | | 7/1974 | Geppert | |
| 5,743,145 A | | 4/1998 | Terada | |

(Continued)

FOREIGN PATENT DOCUMENTS

| EP | 2939929 A1 | 11/2015 |
| FR | 3006733 A1 | 12/2014 |
| GB | 839961 A | 6/1960 |

OTHER PUBLICATIONS

Extended EP Search Report for Application No. 18200841.7 dated Mar. 3, 2019.

*Primary Examiner* — Terence Boes
(74) *Attorney, Agent, or Firm* — Lorenz & Kopf, LLP

(57) ABSTRACT

An accessory system for a gas turbine engine having a driveshaft with an axis of rotation is provided. The system includes a towershaft coupled to the driveshaft and rotatable about a towershaft axis of rotation. The towershaft includes a towershaft bevel gear. The system includes a primary shaft including a first bevel gear and a second bevel gear that each revolve about a primary shaft axis of rotation. The first bevel gear is coupled to the towershaft bevel gear. The system includes a secondary shaft including a third bevel gear and a fourth bevel gear that each revolve about a secondary shaft axis of rotation. The third bevel gear is coupled to the second bevel gear. The system includes a tertiary shaft including a fifth bevel gear that revolves about a tertiary shaft axis of rotation. The fifth bevel gear is coupled to the fourth bevel gear.

19 Claims, 20 Drawing Sheets

(56) References Cited

U.S. PATENT DOCUMENTS

| | | | |
|---|---|---|---|
| 10,077,715 B2* | 9/2018 | Viel | F01D 25/18 |
| 10,502,142 B2* | 12/2019 | Suciu | F16H 1/22 |
| 2008/0072568 A1* | 3/2008 | Moniz | F01D 15/10 |
| | | | 60/226.1 |
| 2012/0117981 A1* | 5/2012 | Suciu | F02C 7/32 |
| | | | 60/802 |
| 2013/0098058 A1* | 4/2013 | Sheridan | F02C 7/32 |
| | | | 60/783 |
| 2013/0145774 A1* | 6/2013 | Duong | F02C 7/32 |
| | | | 60/802 |
| 2015/0308350 A1 | 10/2015 | Dobosz et al. | |
| 2016/0138414 A1* | 5/2016 | Armange | F16H 1/225 |
| | | | 415/182.1 |
| 2016/0245183 A1* | 8/2016 | Viel | F02C 7/32 |
| 2017/0218848 A1* | 8/2017 | Alstad | F02C 7/32 |
| 2018/0283281 A1* | 10/2018 | Veilleux, Jr. | F02C 7/36 |

* cited by examiner

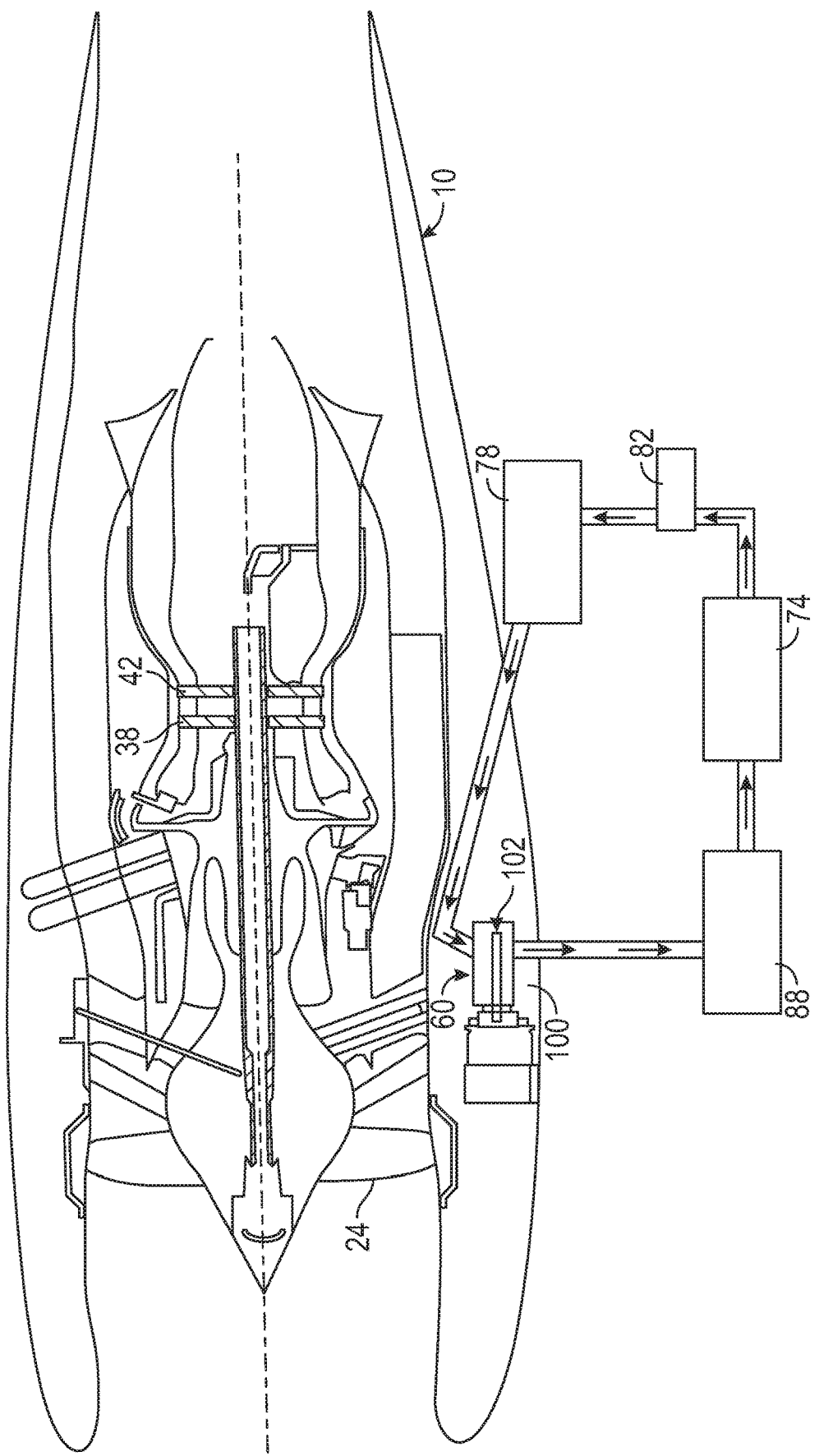

US 10,731,566 B2

COMPACT ACCESSORY SYSTEMS FOR A GAS TURBINE ENGINE

TECHNICAL FIELD

The present disclosure generally relates to gas turbine engines, and more particularly relates to compact accessory systems for a gas turbine engine, such as a compact accessory gearbox for use with a gas turbine engine, which reduces a size of a nacelle that surrounds the gas turbine engine.

BACKGROUND

Gas turbine engines may be employed to power various devices. For example, a gas turbine engine may be employed to power a mobile platform, such as an aircraft. Typically, gas turbine engines include accessories that assist in engine operation and in the operation of the mobile platform, which are driven by the gas turbine engine. The accessories are generally positioned within an engine nacelle. The arrangement of the accessories in the engine nacelle influences the size of the engine nacelle, which may increase drag on the mobile platform.

Accordingly, it is desirable to provide compact accessory systems for a gas turbine engine, which includes a compact accessory gearbox having a reduced size that enables a reduction in size of an engine nacelle. Furthermore, other desirable features and characteristics of the present invention will become apparent from the subsequent detailed description and the appended claims, taken in conjunction with the accompanying drawings and the foregoing technical field and background.

SUMMARY

According to various embodiments, provided is an accessory system for a gas turbine engine having a driveshaft with an axis of rotation. The accessory system includes a towershaft coupled to the driveshaft and rotatable about a towershaft axis of rotation transverse to the axis of rotation of the gas turbine engine. The towershaft includes a towershaft bevel gear at a distal end. The accessory system includes a primary shaft including a first bevel gear and a second bevel gear that each revolve about a primary shaft axis of rotation. The first bevel gear is coupled to the towershaft bevel gear to drive the primary shaft. The accessory system includes a secondary shaft including a third bevel gear and a fourth bevel gear that each revolve about a secondary shaft axis of rotation that is substantially transverse to the primary shaft axis of rotation. The third bevel gear is coupled to the second bevel gear to drive the secondary shaft. The accessory system includes a tertiary shaft including a fifth bevel gear that revolves about a tertiary shaft axis of rotation that is substantially parallel to the primary shaft axis of rotation. The fifth bevel gear is coupled to the fourth bevel gear to drive the tertiary shaft.

Further provided is an accessory system for a gas turbine engine having a driveshaft with an axis of rotation. The accessory system includes a towershaft coupled to the driveshaft and rotatable about a towershaft axis of rotation transverse to the axis of rotation of the gas turbine engine. The towershaft includes a towershaft bevel gear at a distal end. The accessory system includes a primary shaft including a first bevel gear and a second bevel gear that each revolve about a primary shaft axis of rotation. The first bevel gear is coupled to the towershaft bevel gear to drive the primary shaft. The accessory system includes a secondary shaft including a third bevel gear and a fourth bevel gear that each revolve about a secondary shaft axis of rotation that is substantially transverse to the primary shaft axis of rotation. The third bevel gear is coupled to the second bevel gear to drive the secondary shaft. The accessory system includes a tertiary shaft including a fifth bevel gear that revolves about a tertiary shaft axis of rotation that is substantially transverse to the secondary shaft axis of rotation. The fifth bevel gear is coupled to the fourth bevel gear to drive the tertiary shaft. The accessory system includes a quaternary shaft including a sixth bevel gear and an seventh bevel gear that each revolve about a quaternary shaft axis of rotation that is substantially transverse to the primary shaft axis of rotation. The sixth bevel gear is coupled to the second bevel gear to drive the quaternary shaft.

Also provided is an accessory system for a gas turbine engine having a driveshaft with an axis of rotation. The accessory system includes a towershaft coupled to the driveshaft and rotatable about a towershaft axis of rotation transverse to the axis of rotation of the gas turbine engine. The towershaft includes a towershaft bevel gear at a distal end. The accessory system includes a primary shaft including a first bevel gear and a second bevel gear that each revolve about a primary shaft axis of rotation. The first bevel gear is coupled to the towershaft bevel gear to drive the primary shaft. The primary shaft is coupled to a first accessory associated with the gas turbine engine. The primary shaft includes a bearing housing assembly that includes an accessory mount coupled to the primary shaft and to the accessory. The accessory mount includes a lock that is movable relative to the accessory mount and the primary shaft to adjust a contact pattern between the towershaft bevel gear and the first bevel gear. The accessory system includes a secondary shaft including a third bevel gear and a fourth bevel gear that each revolve about a secondary shaft axis of rotation that is substantially transverse to the primary shaft axis of rotation. The third bevel gear is coupled to the second bevel gear to drive the secondary shaft. The accessory system includes a tertiary shaft including a fifth bevel gear that revolves about a tertiary shaft axis of rotation that is substantially transverse to the secondary shaft axis of rotation. The fifth bevel gear is coupled to the fourth bevel gear to drive the tertiary shaft.

DESCRIPTION OF THE DRAWINGS

The exemplary embodiments will hereinafter be described in conjunction with the following drawing figures, wherein like numerals denote like elements, and wherein:

FIG. 1A is a schematic cross-sectional illustration of a gas turbine engine, which includes the exemplary compact accessory system of FIG. 1 and illustrates an exemplary lubrication system for use with the compact accessory gearbox of FIG. 1 in accordance with the various teachings of the present disclosure;

DETAILED DESCRIPTION

Figure 1:
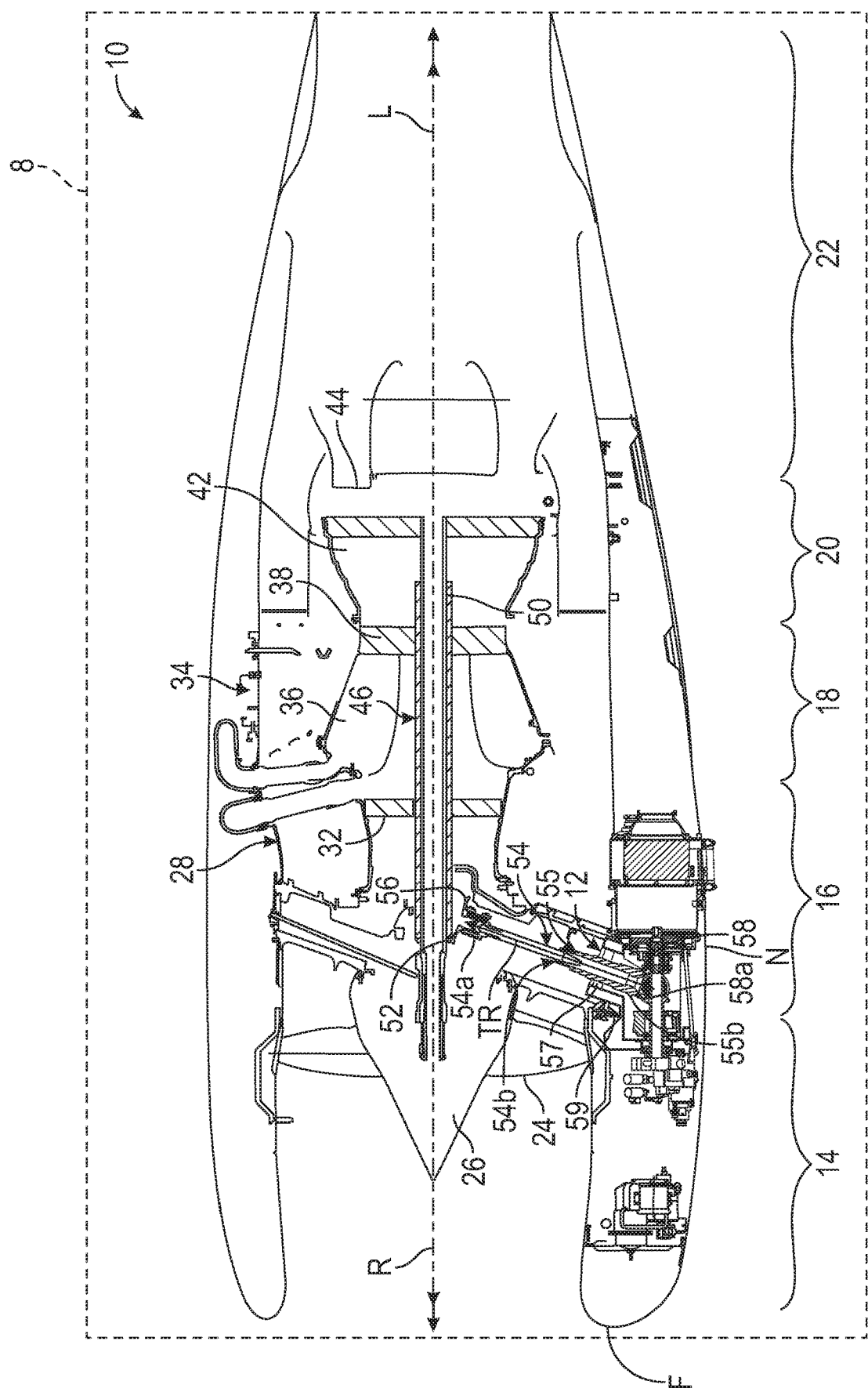
FIG. 1 is a schematic cross-sectional illustration of a gas turbine engine, which includes an exemplary compact accessory system including an exemplary compact accessory gearbox in accordance with the various teachings of the present disclosure.

The following detailed description is merely exemplary in nature and is not intended to limit the application and uses. Furthermore, there is no intention to be bound by any expressed or implied theory presented in the preceding technical field, background, brief summary or the following detailed description. In addition, those skilled in the art will appreciate that embodiments of the present disclosure may be practiced in conjunction with any type of gearbox that would benefit from a reduced or compact configuration, and that the accessory systems and methods described herein for use with a gas turbine engine is merely one exemplary embodiment according to the present disclosure. Moreover, while the accessory systems and methods are described herein as being used with a gas turbine engine onboard a mobile platform, such as a bus, motorcycle, train, motor vehicle, marine vessel, aircraft, rotorcraft and the like, the various teachings of the present disclosure can be used with a gas turbine engine on a stationary platform. Further, it should be noted that many alternative or additional functional relationships or physical connections may be present in an embodiment of the present disclosure. In addition, while the figures shown herein depict an example with certain arrangements of elements, additional intervening elements, devices, features, or components may be present in an actual embodiment. It should also be understood that the drawings are merely illustrative and may not be drawn to scale.

As used herein, the term "axial" refers to a direction that is generally parallel to or coincident with an axis of rotation, axis of symmetry, or centerline of a component or components. For example, in a cylinder or disc with a centerline and generally circular ends or opposing faces, the "axial" direction may refer to the direction that generally extends in parallel to the centerline between the opposite ends or faces. In certain instances, the term "axial" may be utilized with respect to components that are not cylindrical (or otherwise radially symmetric). For example, the "axial" direction for a rectangular housing containing a rotating shaft may be viewed as a direction that is generally parallel to or coincident with the rotational axis of the shaft. Furthermore, the term "radially" as used herein may refer to a direction or a relationship of components with respect to a line extending outward from a shared centerline, axis, or similar reference, for example in a plane of a cylinder or disc that is perpendicular to the centerline or axis. In certain instances, components may be viewed as "radially" aligned even though one or both of the components may not be cylindrical (or otherwise radially symmetric). Furthermore, the terms "axial" and "radial" (and any derivatives) may encompass directional relationships that are other than precisely aligned with (e.g., oblique to) the true axial and radial dimensions, provided the relationship is predominately in the respective nominal axial or radial direction. As used herein, the term "transverse" denotes an axis that crosses another axis at an angle such that the axis and the other axis are neither substantially perpendicular nor substantially parallel. In addition, as used herein the phrase "meshingly engage" or "meshingly engages" denotes contact and engagement between the teeth of respective gears that enables the transfer of torque between the gears.

With reference to FIG. 1, a cross-sectional view of an exemplary gas turbine engine 10 is shown, which includes a compact accessory system 12 according to various embodiments. It should be noted that while the compact accessory system 12 is discussed herein with regard to the gas turbine engine 10, the compact accessory system 12 can be employed with any suitable engine, such as a turbojet engine, an auxiliary power unit (APU), etc. Thus, the following description is merely one exemplary use of the compact accessory system 12. Moreover, while the gas turbine engine 10 is described herein as being used with a mobile platform, such as an aircraft 8, it will be understood that the gas turbine engine 10 may be used with any suitable platform, whether mobile or stationary.

In this example, the gas turbine engine 10 includes a fan section 14, a compressor section 16, a combustor section 18, a turbine section 20, and an exhaust section 22. The fan section 14 includes a fan 24 mounted on a rotor 26 that draws air into the gas turbine engine 10 and accelerates it. A fraction of the accelerated air exhausted from the fan 24 is directed through an outer (or first) bypass duct 28 and the remaining fraction of air exhausted from the fan 24 is directed into the compressor 32.

In the embodiment of FIG. 1, the compressor section 16 includes a compressor 32. However, in other embodiments, the number of compressors in the compressor section 16 may vary. In the depicted embodiment, the compressor 32 raises the pressure of the air and directs the high pressure air into the combustor 36. The fraction of air that entered the first bypass duct 28 enters a second bypass duct 34.

In the embodiment of FIG. 1, in the combustor section 18, which includes an annular combustor 36, the high pressure air is mixed with fuel and combusted. The high-temperature combusted air is then directed into the turbine section 20. The turbine section 20 includes one or more turbines disposed in axial flow series, for example, a high pressure turbine 38 and a low pressure turbine 42. However, it will be appreciated that the number of turbines, and/or the configurations thereof, may vary. In this embodiment, the high-temperature combusted air from the combustor section 18 expands through and rotates each turbine 38 and 42. The air is then exhausted through a mixing nozzle 44 where it is recombined with the bypass flow air in the exhaust section 22. As the turbines 38 and 42 rotate, each drives equipment in the gas turbine engine 10 via concentrically disposed shafts or spools. In one example, the high pressure turbine 38 drives the compressor 32 via a high pressure driveshaft 46 and the low pressure turbine 42 drives the fan 24 via a low pressure driveshaft 50. Generally, the high pressure driveshaft 46 and the low pressure driveshaft 50 are coaxially arranged along a longitudinal axis L of the gas turbine engine 10, and each of the high pressure driveshaft 46 and the low pressure driveshaft 50 have an axis of rotation R, which extends substantially parallel to and along the longitudinal axis L.

In the example of FIG. 1, the high pressure driveshaft 46 includes a gear 52. In this example, the gear 52 is a bevel gear, having a plurality of bevel gear teeth. The gear 52 is coupled to a towershaft 54 and drives the towershaft 54. In one example, the towershaft 54 includes a first end 54a and a second end 54b. The first end 54a includes a gear 56, which in this example, comprises a bevel gear. The gear 56 includes a plurality of bevel gear teeth, which are meshingly coupled to or engaged with the plurality of bevel gear teeth of the gear 52. The engagement of gear 56 with gear 52 transfers torque from the high pressure driveshaft 46 to the towershaft 54, and thus, drives or rotates the towershaft 54. The towershaft 54 is generally coupled to the gear 52 such that the towershaft 54 extends along an axis of rotation TR, which is substantially transverse to the axis of rotation R of the high pressure driveshaft 46. One or more bearings or supports may be coupled to the towershaft 54 at or near the first end 54a to support the towershaft 54 for rotation with the gear 56.

The second end 54b of the towershaft 54 is coupled to the compact accessory system 12 and forms part of the compact accessory system 12. In one example, the second end 54b of the towershaft 54 includes a sleeve 55. The sleeve 55 is coupled about the second end 54b via splined coupling, for example, although any suitable joining technique may be employed such that the sleeve 55 rotates in unison with the towershaft 54. The sleeve 55 may be supported for rotation by a bearing 57, which is disposed in a housing 59. The housing 59 couples the second end 55b of the sleeve 55 to the compact accessory gearbox 60 and the bearing 57 supports the sleeve 55 for rotation relative to a compact accessory gearbox 60. The sleeve 55 further includes a gear 58, such as a bevel gear. The gear 58 is disposed at a second end 55b of the sleeve 55, and includes a plurality of bevel gear teeth 58a. The plurality of bevel gear teeth 58a are coupled about a perimeter or circumference of the gear 58. The gear 58 is coupled to the compact accessory system 12, and the plurality of bevel gear teeth 58a meshingly engage a bevel gear contained within the compact accessory gearbox 60 as will be discussed further herein. Generally, the gear 58 transfers torque from the sleeve 55 and the towershaft 54 to the compact accessory gearbox 60 to drive various components of the compact accessory system 12. The compact accessory system 12, in turn, drives various accessories associated with the gas turbine engine 10. In one example, the compact accessory system 12 is mounted within a nacelle N of the gas turbine engine 10.

During an engine startup, power is delivered from a starter turbine 64 (with air supplied by a starter valve 84) and into compact accessory gearbox 60 at the correct speed (in revolutions per minute (rpm)), driving the sleeve 55 and the towershaft 54, which drives the high pressure driveshaft 46 and turns the compressor 32 and high pressure turbine 38 of the gas turbine engine 10 allowing the gas turbine engine 10 to start. It should be noted that while the starter turbine 64 is described herein, any starter may be employed, including, but not limited to an electric starter that through suitable gearing drives the compact accessory gearbox 60 to turn the high pressure driveshaft 46.

Figure 2:
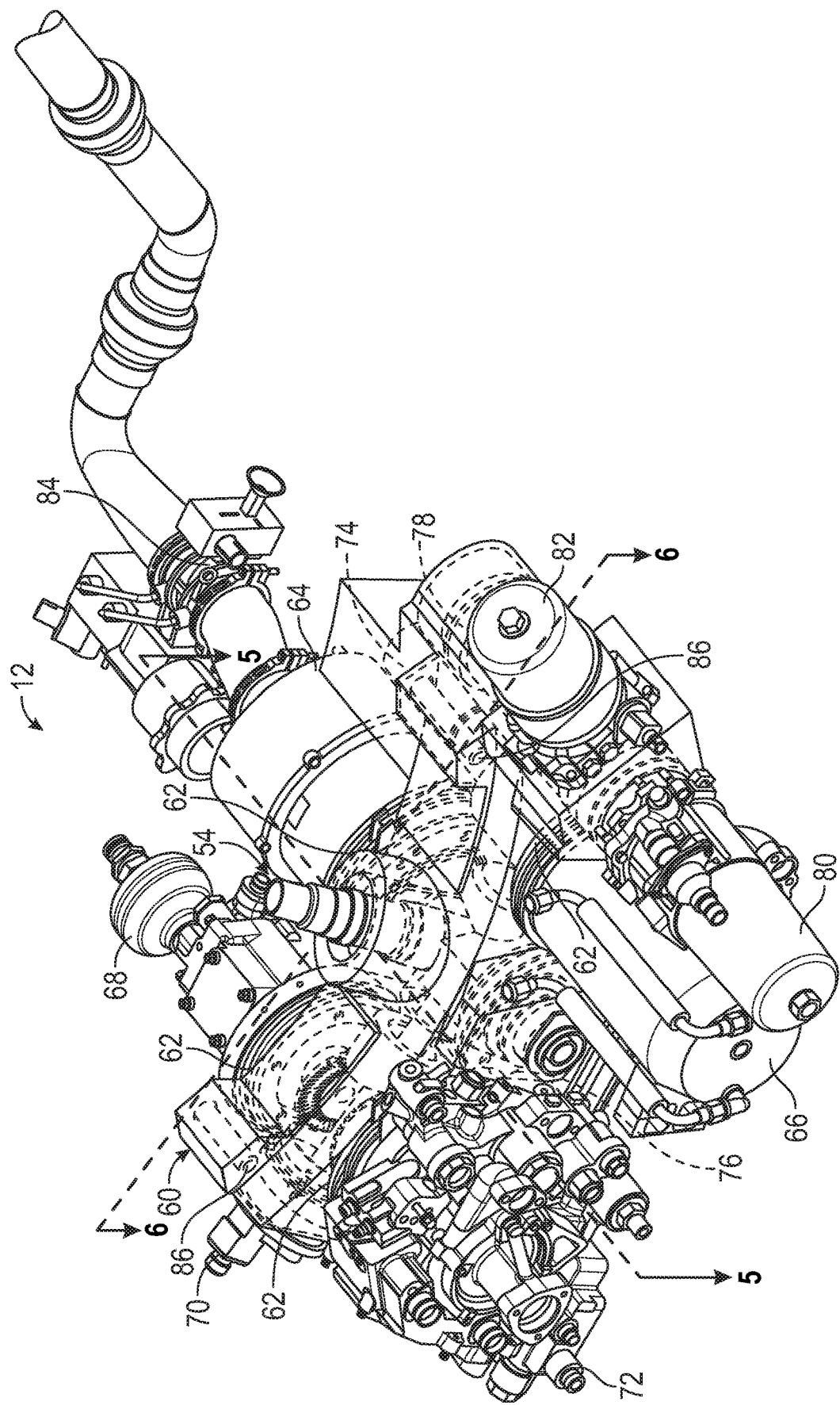
FIG. 2 is a perspective view of the compact accessory system of FIG. 1, which includes the compact accessory gearbox of FIG. 1 and various accessories driven by the compact accessory gearbox in accordance with various embodiments.

With reference to FIG. 2, the compact accessory system 12 is shown in greater detail. In this example, the compact accessory system 12 includes the compact accessory gearbox 60, which drives various accessories, including, but not limited to, a starter turbine 64, a direct-current (DC) generator 66, a hydraulic pump 68, a permanent magnet alternator 70, a fuel control unit 72, a lubrication pump 74, an air-oil separator 76, a fuel heated oil cooler 78, a fuel filter 80 and an oil filter 82. The starter valve 84 and associated ducting supplies air to the starter turbine 64 from an auxiliary power unit (APU), for example, for starting the gas turbine engine 10. Generally, the compact accessory gearbox 60 is coupled to the towershaft 54 via the gear 58 to receive the torque from the towershaft 54 and to drive the accessories 66-78. It should be noted that the accessories 66-82 described herein are merely exemplary, as the compact accessory gearbox 60 may be used to drive any suitable accessory associated with the gas turbine engine 10.

As the accessories 64-82 are generally known to one skilled in the art, the accessories 64-82 will not be discussed in great detail herein. Briefly, however, the starter valve 84 receives pressurized air from an APU associated with the aircraft 8 to supply air to the starter turbine 64. The starter turbine 64 is coupled to the starter valve 84, and to the compact accessory gearbox 60. The starter turbine 64 converts the pressurized air from the APU into rotational energy, which is used to drive the towershaft 54, which via the gears 56, 52, drives the high pressure driveshaft 46, and thus, the compressor 32 and the high pressure turbine 38 for starting the gas turbine engine 10 (FIG. 1). Alternatively, an electric starter converts electricity into rotational energy, which is used to drive the towershaft 54, which via the gears 56, 52, drives the high pressure driveshaft 46, and thus, the compressor 32 and the high pressure turbine 38 for starting the gas turbine engine 10. The direct-current (DC) generator 66 is coupled to the compact accessory gearbox 60, and is driven to convert mechanical energy received from the towershaft 54 into electricity to power various electrical items onboard the aircraft 8. The hydraulic pump 68 is coupled to the compact accessory gearbox 60 and is driven to provide high pressure hydraulic fluid to one or more hydraulic components of the aircraft 8 and to power the aircraft's flight control system. It may also be used to power a hydraulically actuated thrust reverser associated with the gas turbine engine 10.

The permanent magnet alternator 70 is coupled to the compact accessory gearbox 60, and is driven to provide alternating current (AC) power to an engine control unit associated with the gas turbine engine 10. The fuel control unit 72 is coupled to the compact accessory gearbox 60 and is driven to provide fuel to the combustor 36 of the gas turbine engine 10 (FIG. 1). The fuel control unit 72 includes, but is not limited to, a hydromechanical fuel control unit, an electronic fuel control unit, etc. The lubrication pump 74 is coupled to the compact accessory gearbox 60 and driven to provide oil at the desired operating pressure to various portions of the gas turbine engine 10. The air-oil separator 76 is contained within the compact accessory gearbox 60 and is driven to separate air from oil within the compact accessory gearbox 60. The fuel heated oil cooler 78 cools oil and heats the fuel. The fuel filter 80 removes contaminants from the fuel, and the oil filter 82 removes contaminants from the oil. As will be discussed in further detail herein, at least the accessories 64-72 may be coupled to the compact accessory gearbox 60 via a bearing housing assembly or adapter 62.

Generally, the compact accessory gearbox 60 is coupled to the gas turbine engine 10 via one or more supports or struts (not shown). Generally, the struts extend outwardly from the compact accessory gearbox 60 in a generally V-shape. In one example, the struts include one or more mounting bores 86 that receive a mechanical fastener, such as a bolt, to couple the struts to the compact accessory gearbox 60. The struts couple the compact accessory gearbox 60 to the gas turbine engine 10. For example, the struts may define one or more bores for receipt of a mechanical fastener to couple the struts to the compact accessory gearbox 60 and to the gas turbine engine 10.

Figure 3:
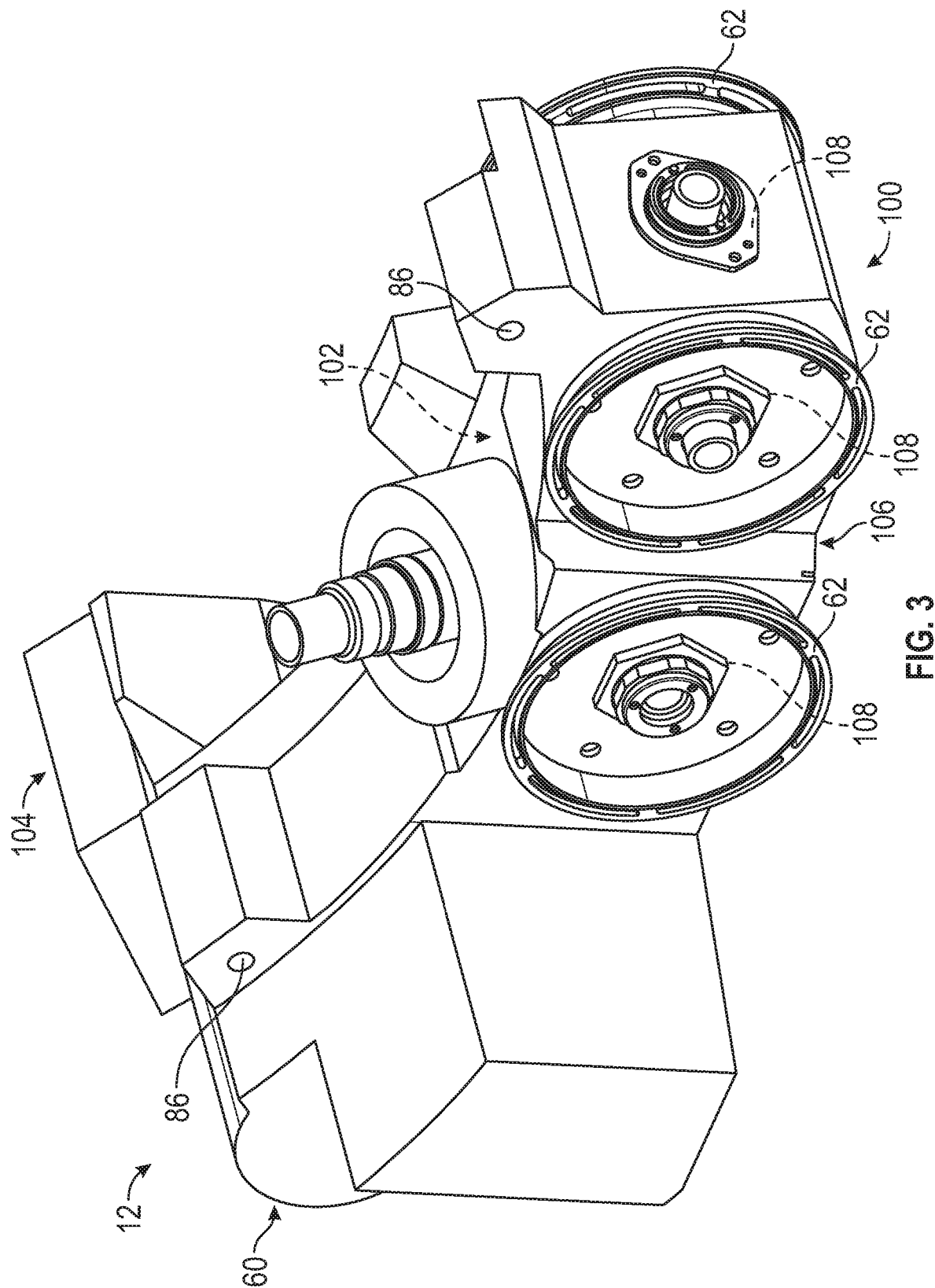
FIG. 3 is a rear perspective view of the compact accessory gearbox of FIG. 2, in which the various accessories have been removed for clarity.
Figure 4:
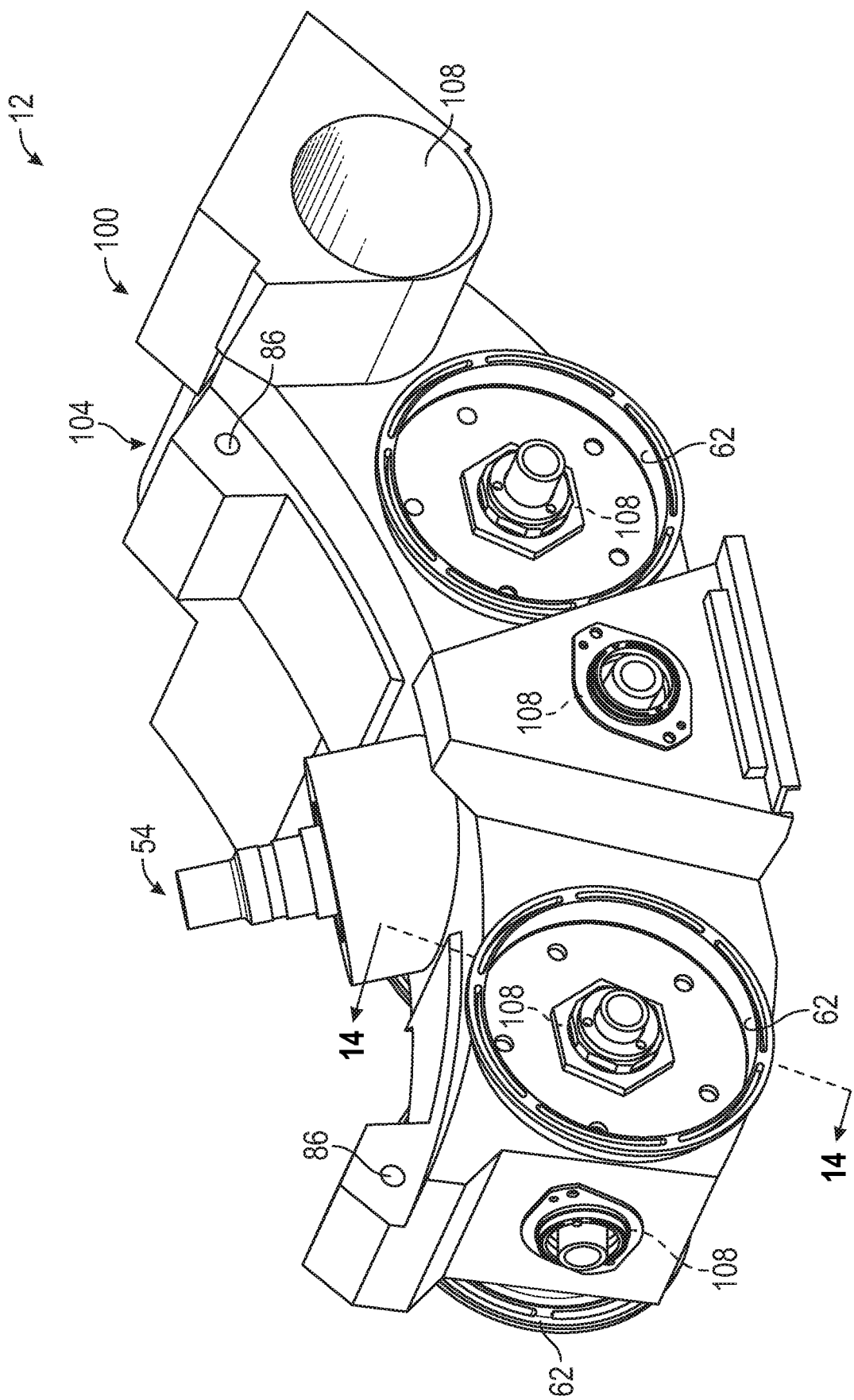
FIG. 4 is a front perspective view of the of the compact accessory gearbox of FIG. 2, in which the various accessories have been removed for clarity.
Figure 5:
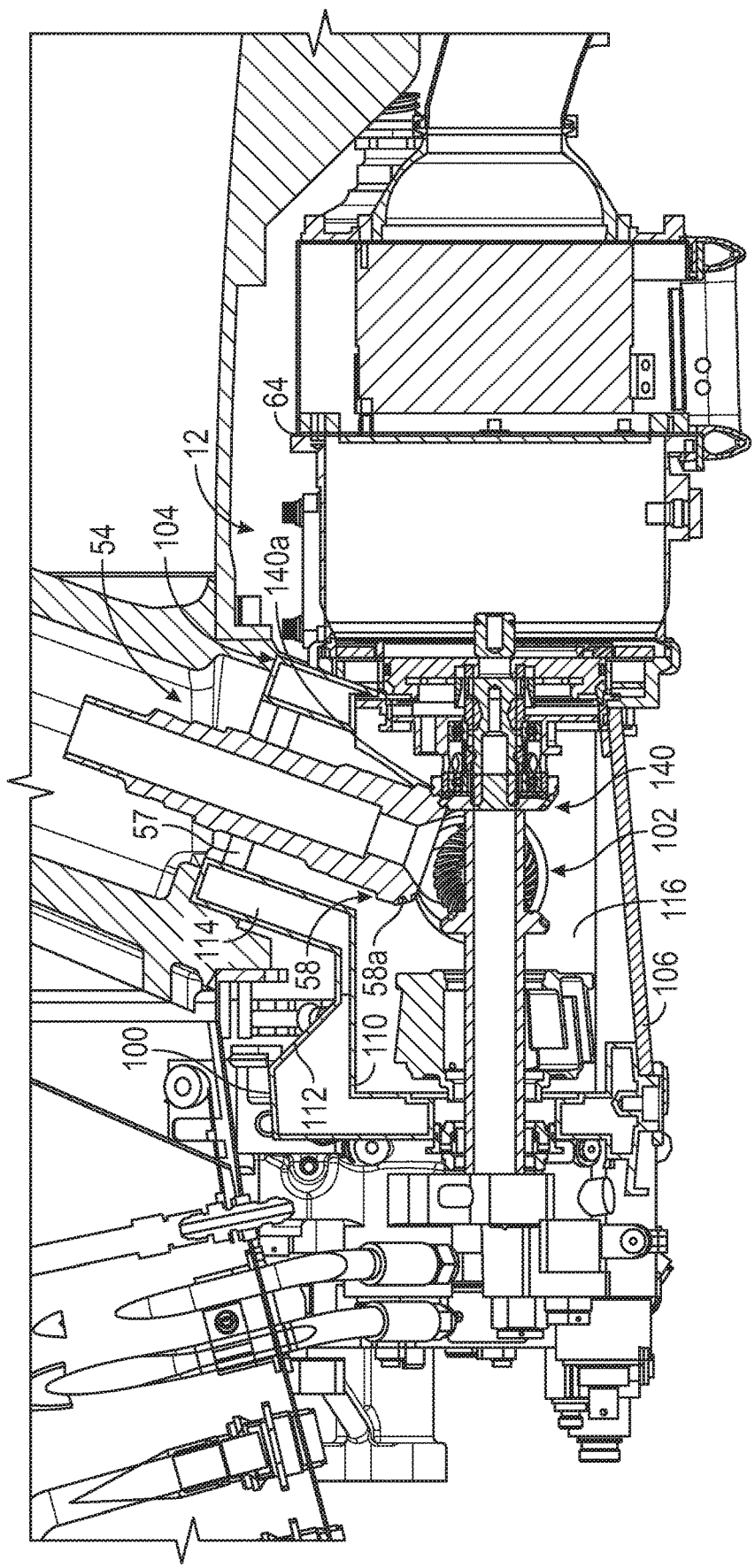
FIG. 5 is a cross-sectional view of the of the compact accessory gearbox of FIG. 2, taken along line 5-5 of FIG. 2.

With reference to FIGS. 3, 4 and 5, the compact accessory system 12 is shown with the accessories 64-82 removed for clarity. The compact accessory gearbox 60 includes the housing or gear case 100 and the gear train 102. In this example, the gear case 100 comprises a two-piece housing, with a first portion 104 and a second portion 106 (FIG. 5). The gear case 100 is composed of a metal, metal alloy or composite. The first portion 104 and the second portion 106 are formed through any suitable technique, such as casting, forging, machining, stamping, fiber layup, etc. Generally, the first portion 104 comprises a plurality of apertures 108 to couple the gear train 102 to the various accessories 64-82. In this example, the first portion 104 includes about seven apertures 108; however, the first portion 104 may include any desired number of apertures 108. The plurality of apertures 108 are defined about the first portion 104 so as to extend about a perimeter of the first portion 104, such that the accessories 64-82 are arranged about a perimeter of the first portion 104. Generally, the arrangement of the accessories 64-82 about the perimeter of the first portion 104 enables a reduction in the volume of the engine nacelle N (FIG. 1). As will be discussed further herein, one or more of the plurality of apertures 108 is sized and shaped to receive a portion of the adapter 62.

Figure 6:
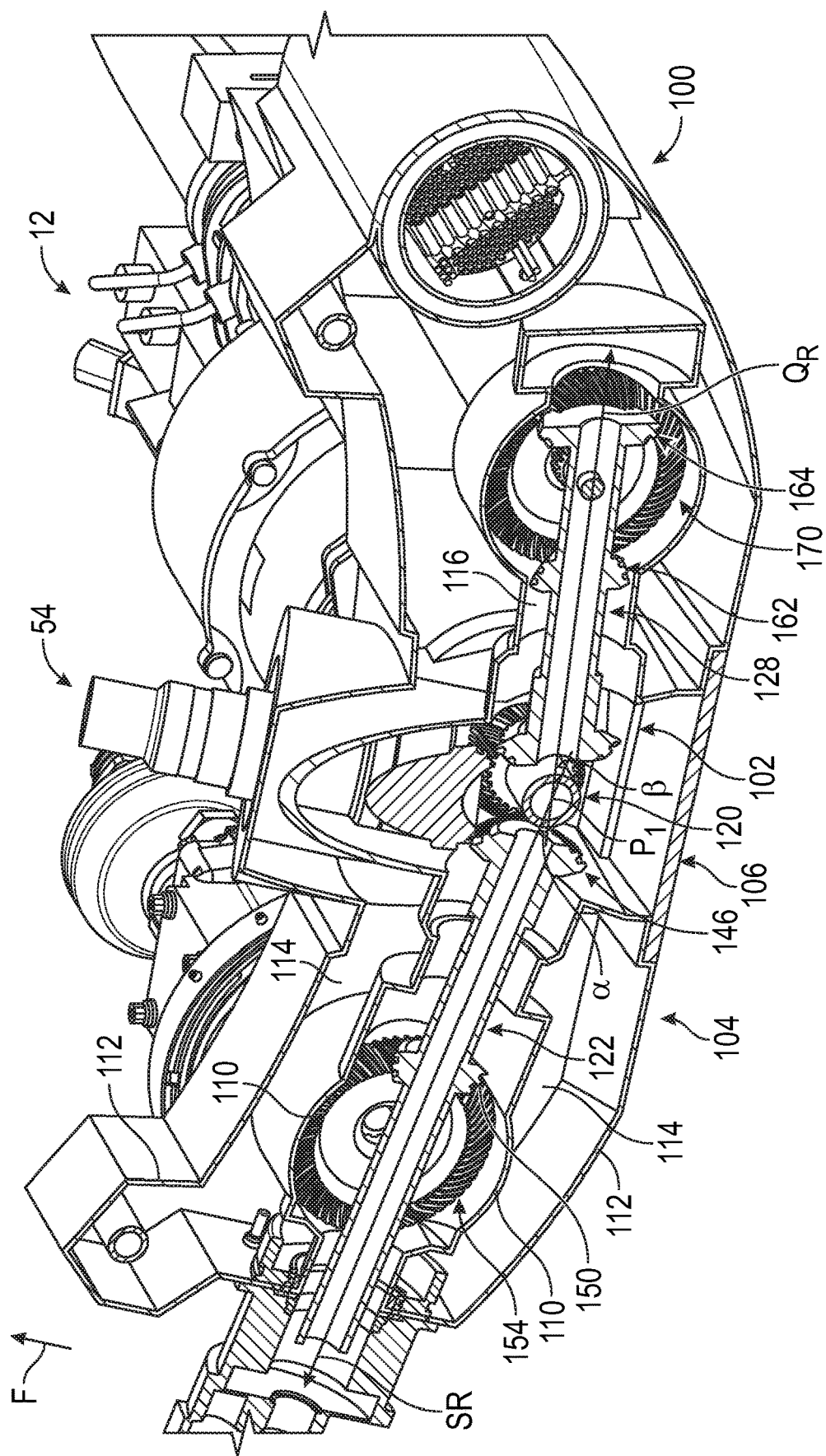
FIG. 6 is a cross-sectional view of the of the compact accessory gearbox of FIG. 2, taken along line 6-6 of FIG. 2.

With reference to FIGS. 5 and 6, cross-sections taken through the compact accessory system 12 are shown. As shown in FIGS. 5 and 6, the first portion 104 includes a first, inner wall 110 and a second, outer wall 112 that cooperate to enclose a first volume 114 that receives a lubricating fluid, such as oil. In this example, a majority of the oil is contained within the first volume 114 defined by the inner wall 110 and the outer wall 112, while the gear train 102 is contained within a second volume 116 defined by the inner wall 110. By defining the first volume 114 within the gear case 100 that is sealed off and separate from the second volume 116 that includes the gear train 102, the gear train 102 does not rotate within an oil bath. Stated another way, oil fills the first volume 114, but does not fill the second volume 116. Rather, oil may be supplied to the gear train 102 at one or more gear mesh interfaces by core passages, nozzles, fogging, injection, orifices, etc. This enables the volume of oil to be separated from the gear train 102 as it rotates. In one example, with reference to FIG. 1A, the oil or lubricating fluid for the compact accessory gearbox 60 may be received from an oil tank 88 disposed near the compact accessory gearbox 60 within the engine nacelle N. One or more conduits are coupled between the oil tank 88 and the compact accessory gearbox 60 to enable oil from the oil tank 88 to flow to the first volume 114 for lubricating the gear train 102. For example, the oil in the oil tank 88 flows to the lubrication pump 74, through the oil filter 82, and through the fuel heated oil cooler 78, which delivers the oil or lubricating fluid into the first volume 114. From the first volume 114, the oil flows through a respective core passage, nozzle, orifice, etc., to deliver the oil or lubricating fluid to the gear mesh of the compact accessory gearbox 60 to lubricate the gear train 102. The oil is scavenged from the compact accessory gearbox 60 and returns to the oil tank 88. The oil tank 88 and the compact accessory gearbox 60 may include one or more fittings, hoses, control valves and ports, which fluidly couple the conduits to the oil tank 88 and the compact accessory gearbox 60.

Figure 7:
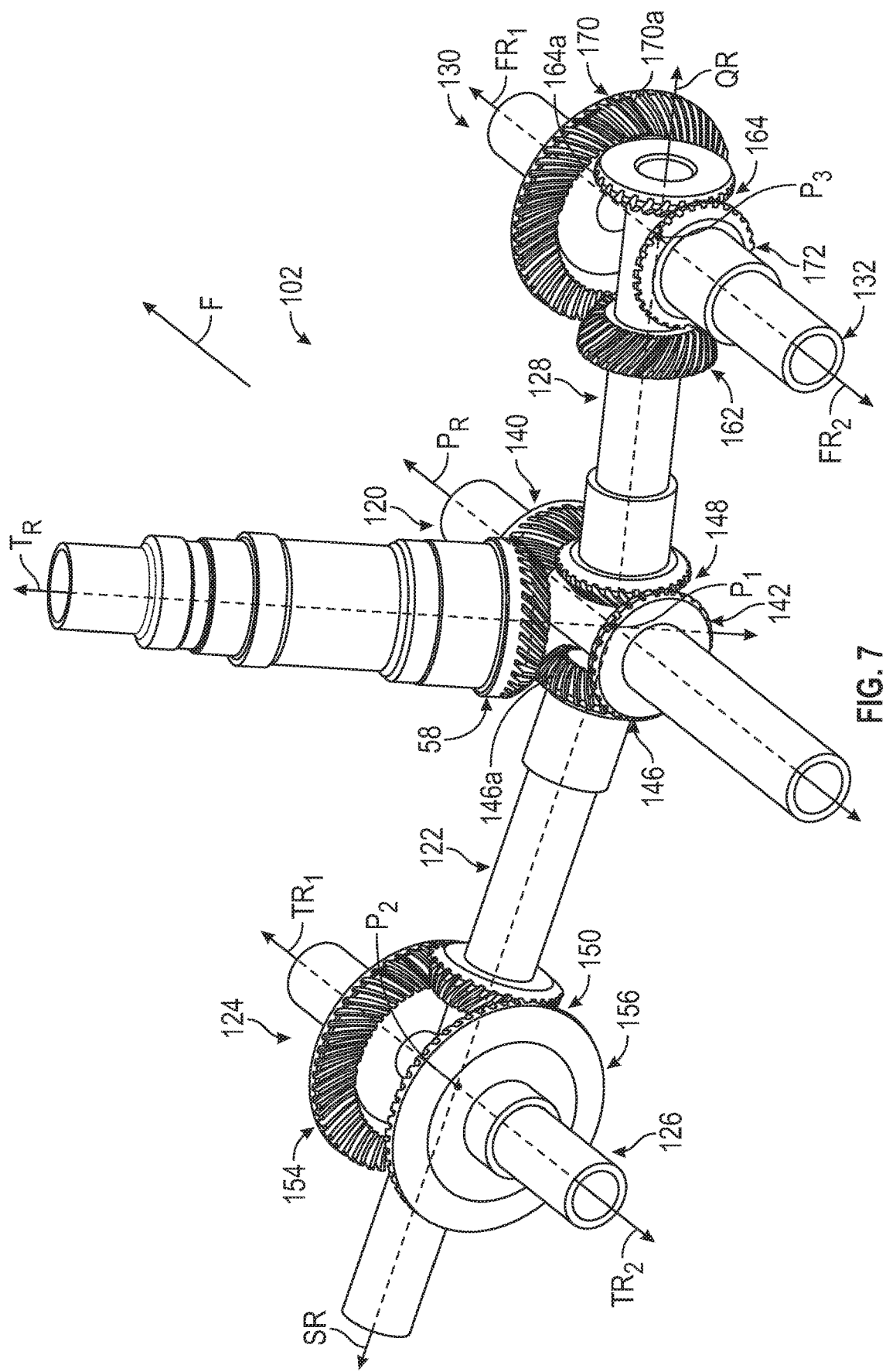
FIG. 7 is a perspective view of the gear train of the compact accessory gearbox of FIG. 2.

With reference to FIG. 7, the gear train 102 is shown removed from the gear case 100 and without the adapters 62 and the accessories 64-82 for clarity. The arrow F denotes a direction of the front of the gas turbine engine 10 (FIG. 1). The gear train 102 is coupled to the respective accessories 64-78. The gear train 102 includes a first, primary shaft or primary drive shaft 120, a second, secondary shaft or secondary drive shaft 122, a pair of third, tertiary shafts or a first tertiary drive shaft 124 and a second tertiary drive shaft 126, a fourth, quaternary or quaternary drive shaft 128, and a pair of fifth, quinary shafts or a first quinary drive shaft 130 and a second quinary drive shaft 132. As will be discussed in greater detail herein, the gear 58 of the towershaft 54 is coupled to or meshingly engages with the primary drive shaft 120, and the primary drive shaft 120 is coupled to or meshingly engages with the secondary drive shaft 122 and the quaternary drive shaft 128. With reference to FIGS. 2 and 3, the primary drive shaft 120 drives the secondary drive shaft 122 and the quaternary drive shaft 128 during operation of the gas turbine engine 10 (FIG. 1), and also drives the air-oil separator 76. The primary drive shaft 120 is driven by the starter turbine 64 during engine start-up. The starter turbine 64 is generally decoupled from the primary drive shaft 120 after the start-up of the gas turbine engine 10 by an overspeed clutch. The secondary drive shaft 122 drives the pair of tertiary drive shafts 124, 126, and drives the permanent magnet alternator 70. The first tertiary drive shaft 124 drives the hydraulic pump 68; and the second tertiary drive shaft 126 drives the fuel control unit 72. The quaternary drive shaft 128 drives the pair of quinary drive shafts 130, 132. The first quinary drive shaft 130 drives the lubrication pump 74; and the second quinary drive shaft 132 drives the DC generator 66.

As shown, the primary drive shaft 120 rotates about a primary or first axis of rotation PR, which is substantially transverse to the axis of rotation TR of the towershaft 54.

The first axis of rotation PR of the primary drive shaft 120 is substantially parallel to the axis of rotation R of the gas turbine engine 10 (FIG. 1). In certain embodiments, however, the first axis of rotation PR of the primary drive shaft 120 may not be substantially parallel to the axis of rotation R. The secondary drive shaft 122 rotates about a secondary or second axis of rotation SR, which is substantially transverse to the axis of rotation PR of the primary drive shaft 120 and is substantially transverse to the axis of rotation TR of the towershaft 54. The pair of tertiary drive shafts 124, 126 each rotate about a tertiary or third axis of rotation TR1, TR2, which are each substantially transverse or oblique to the secondary axis of rotation SR of the secondary drive shaft 122. The third axis of rotation TR1 of the first tertiary drive shaft 124 is substantially the same as the third axis of rotation TR2 of the second tertiary drive shaft 126.

The quaternary drive shaft 128 rotates about a quaternary or fourth axis of rotation QR, which is substantially transverse or oblique to the first axis of rotation PR of the primary drive shaft 120 and is substantially transverse to each of the third accessory axes of rotation TR1, TR2. The fourth axis of rotation QR is also substantially transverse to the second axis of rotation SR, and intersects the second axis of rotation SR along the first axis of rotation PR of the primary drive shaft 120. Each of the pair of quinary drive shafts 130, 132 rotates about a respective quinary or fifth axis of rotation FR1, FR2, which are each substantially transverse or oblique to the fourth axis of rotation QR of the quaternary drive shaft 128. The fifth axis of rotation FR1 of the first quinary drive shaft 130 is substantially the same as the fifth axis of rotation FR2 of the second quinary drive shaft 132.

Each of the first axis of rotation PR, the second axis of rotation SR, the third axes of rotation TR1, TR2, the fourth axis of rotation QR and the fifth axes of rotation FR1, FR2 define the centerlines for each of the respective drive shafts 120-132. Generally, the second axis of rotation SR and the fourth axis of rotation QR intersect the first axis of rotation PR at a first point P1 defined on the first axis of rotation PR. Each of the third axes of rotation TR1, TR2 intersect the second axis of rotation SR at a second point P2 defined on the second axis of rotation SR. Each of the fifth axes of rotation FR1, FR2 intersect the fourth axis of rotation QR at a third point P3 defined on the fourth axis of rotation QR. Each of the points P1, P2, P3 are distinct and spaced apart from each other. It should be noted that although various axes of rotation are illustrated and described herein as intersecting, in certain instances, one or more hypoid bevel gear arrangements may be employed, which may result in the axes not intersecting. As shown, the gear train 102 arranges the accessories 64-82 in two rows on either side of the gear case 100 (FIG. 2). By arranging the accessories 64-82 in two rows, the compact accessory system 12 has a reduced size, which enables a reduction in size of the nacelle N (FIG. 1) that surrounds the compact accessory system 12.

In one example, with reference back to FIG. 6, the secondary drive shaft 122 is orientated at an angle α relative to the primary drive shaft 120. In one example, the angle α is about 5 to about 15 degrees. In a further example, the quaternary drive shaft 128 is orientated at an angle β relative to the primary drive shaft 120. In one example, the angle β is about 5 to about 15 degrees. The angles α, β enable the compact accessory system 12 to follow a curvature of the gas turbine engine 10, which also aids in the reduction of volume of the nacelle N (FIG. 1). Generally, the angles α, β are independent such that angle α is not equal to angle β.

Figure 8:
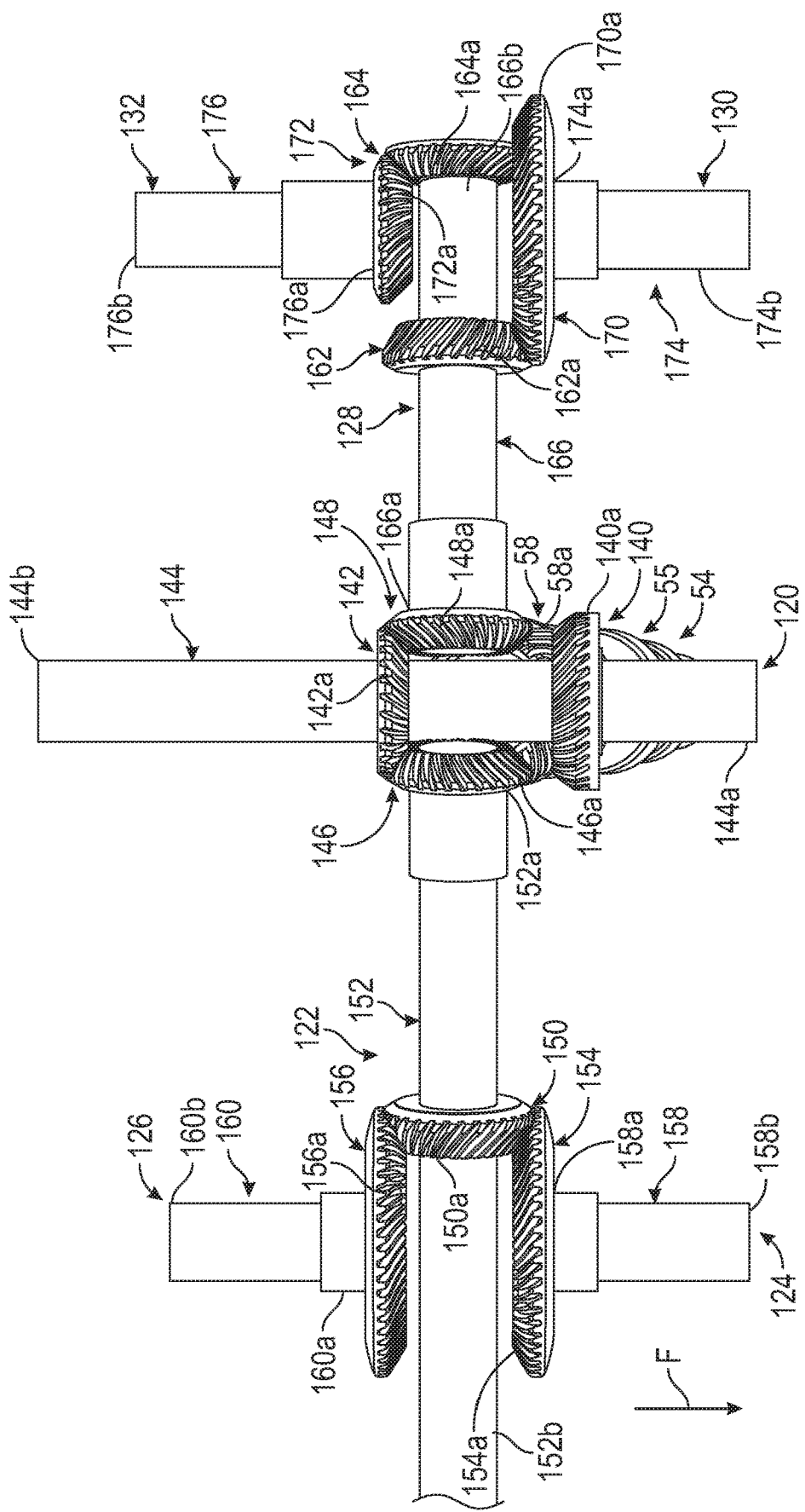
FIG. 8 is a bottom view of the gear train of FIG. 7.

With reference to FIG. 8, a rear view of the gear train 102 is shown removed from the gear case 100 and without the adapters 62 and the accessories 64-82 for clarity. The primary drive shaft 120 is directly coupled to the towershaft 54, and comprises a high speed shaft. For example, the primary drive shaft 120 rotates at about 18,500 revolutions per minute (rpm). The primary drive shaft 120 includes a first bevel gear or first primary shaft gear 140 and a second bevel gear or second primary shaft gear 142 each arranged on and coupled to a body 144 of the primary drive shaft 120. The first primary shaft gear 140, the second primary shaft gear 142 and the body 144 are formed of a metal or metal alloy, and may be cast, machined, stamped, forged, selective metal sintered, etc. In one example, the first primary shaft gear 140 and second primary shaft gear 142 are machined as one piece with the body 144 of the primary drive shaft 120, however, the first primary shaft gear 140 and second primary shaft gear 142 may be coupled to the body 144 via any technique, including, but not limited to, keyway, welding, splined attachments, machined as one piece, 3D printed, etc. The body 144 of the primary drive shaft 120 includes a first end 144a and an opposite, second end 144b. The first end 144a of the body 144 is coupled to the starter turbine 64, and the air-oil separator 76 is coupled between the second primary shaft gear 142 and the second end 144b of the body 144 (FIG. 2). As will be discussed further below, the first end 144a of the body 144 is coupled to the starter turbine 64 by one of the adapters 62.

Generally, the first primary shaft gear 140 is coupled to or defined on the body 144 near the first end 144a, and the second primary shaft gear 142 is coupled to or defined on the body 144 between the first primary shaft gear 140 and the second end 144b. The second primary shaft gear 142 is spaced apart from the first primary shaft gear 140. The first primary shaft gear 140 and the second primary shaft gear 142 each revolve about the primary shaft axis of rotation PR (FIG. 7). In this example, the first primary shaft gear 140 and second primary shaft gear 142 each comprise bevel gears having a respective plurality of bevel gear teeth 140a, 142a. The plurality of bevel gear teeth 140a-142a are defined about a perimeter or circumference of each of the shaft gears 140-142. The plurality of bevel gear teeth 140a of the first primary shaft gear 140 are coupled to and meshingly engage with the plurality of bevel gear teeth 58a of the gear 58 associated with the towershaft 54. The plurality of bevel gear teeth 142a of the second primary shaft gear 142 are coupled to and meshingly engage with a plurality of bevel gear teeth 146a of a third bevel gear or first secondary shaft gear 146 coupled to the secondary drive shaft 122. The plurality of bevel gear teeth 142a of the second primary shaft gear 142 are also coupled to and meshingly engage with a plurality of bevel gear teeth 148a of a seventh bevel gear or first quaternary shaft gear 148 coupled to the quaternary drive shaft 128.

The secondary drive shaft 122 is directly coupled to the primary drive shaft 120, and comprises a high speed shaft. For example, the secondary drive shaft 122 rotates at about 18,500 revolutions per minute (rpm). The secondary drive shaft 122 includes the first secondary shaft gear 146 and a fourth bevel gear or second secondary shaft gear 150 each arranged on and coupled to a second body 152 of the secondary drive shaft 122. The first secondary shaft gear 146, the second secondary shaft gear 150 and the second body 152 are formed of a metal or metal alloy, and may be cast, machined, stamped, forged, selective metal sintered, etc. In one example, the first secondary shaft gear 146 and second secondary shaft gear 150 are machined as one piece with the second body 152 of the secondary drive shaft 122, however, the first secondary shaft gear 146 and second secondary shaft gear 150 may be coupled to the second body 152 via any technique, including, but not limited to, keyway, welding, splined attachments, etc. The second body 152 of the secondary drive shaft 122 includes a first end 152*a* and an opposite, second end 152*b*. The first end 152*a* of the second body 152 is coupled to the first secondary shaft gear 146, and the second end 152*b* of the second body 152 is coupled to the permanent magnet alternator 70 (FIG. 2).

Generally, the first secondary shaft gear 146 is coupled to or defined on the second body 152 at the first end 152*a*, and the second secondary shaft gear 150 is coupled to or defined on the second body 152 between the first secondary shaft gear 146 and the second end 152*b*. The second secondary shaft gear 150 is spaced apart from the first secondary shaft gear 146. The first secondary shaft gear 146 and the second secondary shaft gear 150 each revolve about the second shaft axis of rotation SR (FIG. 7). In this example, the first secondary shaft gear 146 and the second secondary shaft gear 150 each comprise bevel gears having a respective plurality of bevel gear teeth 146*a*, 150*a*. The plurality of bevel gear teeth 146*a*, 150*a* are defined about a perimeter or circumference of each of the secondary shaft gears 146, 150. The plurality of bevel gear teeth 146*a* of the first secondary shaft gear 146 are coupled to and meshingly engage with the plurality of bevel gear teeth 142*a* of the second primary shaft gear 142. The plurality of bevel gear teeth 150*a* of the second secondary shaft gear 150 are coupled to and meshingly engage with a plurality of bevel gear teeth 154*a* of a fifth bevel gear or first tertiary shaft gear 154 coupled to the first tertiary drive shaft 124. The plurality of bevel gear teeth 150*a* of the second secondary shaft gear 150 are also coupled to and meshingly engage with a plurality of bevel gear teeth 156*a* of a sixth bevel gear or second tertiary shaft gear 156 coupled to the second tertiary drive shaft 126.

The first tertiary drive shaft 124 is directly coupled to the secondary drive shaft 122, and comprises a low speed shaft. For example, the first tertiary drive shaft 124 rotates at about 8,400 revolutions per minute (rpm). The first tertiary drive shaft 124 includes the first tertiary shaft gear 154, which is arranged on and coupled to a third body 158 of the first tertiary drive shaft 124. The first tertiary shaft gear 154 and the third body 158 are formed of a metal or metal alloy, and may be cast, machined, stamped, forged, selective metal sintered, etc. In one example, the first tertiary shaft gear 154 are machined as one piece with the third body 158 of the first tertiary drive shaft 124, however, the first tertiary shaft gear 154 may be coupled to the third body 158 via any technique, including, but not limited to, keyway, welding, machined as one piece, 3D printed, etc. The third body 158 of the first tertiary drive shaft 124 includes a first end 158*a* and an opposite, second end 158*b*. The first end 158*a* of the third body 158 is coupled to the first tertiary shaft gear 154, and the second end 158*b* of the third body 158 is coupled to the hydraulic pump 68 to drive the hydraulic pump 68 (FIG. 2).

Generally, the first tertiary shaft gear 154 is coupled to or defined on the third body 158 at the first end 158*a*. The first tertiary shaft gear 154 revolves about the third shaft axis of rotation TR1 (FIG. 7). In this example, the first tertiary shaft gear 154 comprises a bevel gear having the plurality of bevel gear teeth 154*a*. The plurality of bevel gear teeth 154*a* are defined about a perimeter or circumference of the first tertiary shaft gear 154. The plurality of bevel gear teeth 154*a* of the first tertiary shaft gear 154 is coupled to and meshingly engages with the plurality of bevel gear teeth 150*a* of the second secondary shaft gear 150.

The second tertiary drive shaft 126 is directly coupled to the secondary drive shaft 122, and comprises a low speed shaft. For example, the second tertiary drive shaft 126 rotates at about 8,400 revolutions per minute (rpm). The second tertiary drive shaft 126 includes the second tertiary shaft gear 156, which is arranged on and coupled to a fourth body 160 of the second tertiary drive shaft 126. The second tertiary shaft gear 156 and the fourth body 160 are formed of a metal or metal alloy, and may be cast, machined, stamped, forged, selective metal sintered, etc. In one example, the second tertiary shaft gear 156 are machined as one piece with the fourth body 160 of the second tertiary drive shaft 126, however, the second tertiary shaft gear 156 may be coupled to the fourth body 160 via any technique, including, but not limited to, keyway, welding, splined attachments, machined as one piece, 3D printed, etc. The fourth body 160 of the second tertiary drive shaft 126 includes a first end 160*a* and an opposite, second end 160*b*. The first end 160*a* of the fourth body 160 is coupled to the second tertiary shaft gear 156, and the second end 160*b* of the fourth body 160 is coupled to the fuel control unit 72 to drive the fuel control unit 72 (FIG. 2).

In one example, the second tertiary shaft gear 156 is coupled to or defined on the fourth body 160 at the first end 160*a*. The second tertiary shaft gear 156 revolves about the third shaft axis of rotation TR2 (FIG. 7). In this example, the second tertiary shaft gear 156 comprises a bevel gear having the plurality of bevel gear teeth 156*a*. The plurality of bevel gear teeth 156*a* are defined about a perimeter or circumference of the second tertiary shaft gear 156. The plurality of bevel gear teeth 156*a* of the second tertiary shaft gear 156 is coupled to and meshingly engages with the plurality of bevel gear teeth 150*a* of the second secondary shaft gear 150.

The quaternary drive shaft 128 is directly coupled to the primary drive shaft 120, and comprises a high speed shaft. For example, the quaternary drive shaft 128 rotates at about 18,500 revolutions per minute (rpm). The quaternary drive shaft 128 includes the first quaternary shaft gear 148, an eighth or second quaternary shaft gear 162 and a ninth or third quaternary shaft gear 164 each arranged on and coupled to a fifth body 166 of the quaternary drive shaft 128. The first quaternary shaft gear 148, the second quaternary shaft gear 162, the third quaternary shaft gear 164 and the fifth body 166 are formed of a metal or metal alloy, and may be cast, machined, stamped, forged, selective metal sintered, etc. In one example, the first quaternary shaft gear 148, the second quaternary shaft gear 162 and the third quaternary shaft gear 164 are machined as one piece with the fifth body 166 of the quaternary drive shaft 128, however, the first quaternary shaft gear 148, the second quaternary shaft gear 162 and the third quaternary shaft gear 164 may be coupled to the fifth body 166 via any technique, including, but not limited to, keyway, welding, splined attachments, machined as one piece, 3D printed, etc. The fifth body 166 of the quaternary drive shaft 128 includes a first end 166*a* and an opposite, second end 166*b*. The first end 166*a* of the fifth body 166 is coupled to the first quaternary shaft gear 148, and the second end 166*b* of the fifth body 166 is coupled to the third quaternary shaft gear 164.

Generally, the first quaternary shaft gear 148 is coupled to or defined on the fifth body 166 at the first end 166*a*, and the third quaternary shaft gear 164 is coupled to or defined on the fifth body 166 at the second end 166*b*. The second quaternary shaft gear 162 is coupled to or defined on the fifth body 166 between the first quaternary shaft gear 148 and the third quaternary shaft gear 164. In this example, the second quaternary shaft gear 162 is coupled to or defined on the fifth body 166 to be closer to the third quaternary shaft gear 164 than the first quaternary shaft gear 148. The second quaternary shaft gear 162 is spaced apart from the first quaternary shaft gear 148 and the third quaternary shaft gear 164. The first quaternary shaft gear 148, the second quaternary shaft gear 162 and the third quaternary shaft gear 164 each revolve about the fourth shaft axis of rotation QR (FIG. 7). In this example, the first quaternary shaft gear 148, the second quaternary shaft gear 162 and the third quaternary shaft gear 164 each comprise bevel gears having a respective plurality of bevel gear teeth 148a, 162a, 164a. The plurality of bevel gear teeth 148a, 162a, 164a are defined about a perimeter or circumference of each of the quaternary shaft gears 148, 162, 164. The plurality of bevel gear teeth 148a of the first quaternary shaft gear 148 are coupled to and meshingly engage with the plurality of bevel gear teeth 142a of the second primary shaft gear 142 to drive the quaternary drive shaft 128. The plurality of bevel gear teeth 162a of the second quaternary shaft gear 162 are coupled to and meshingly engage with a plurality of bevel gear teeth 170a of a tenth bevel gear or first quinary shaft gear 170 coupled to the first quinary drive shaft 130. The plurality of bevel gear teeth 164a of the third quaternary shaft gear 164 are coupled to and meshingly engage with a plurality of bevel gear teeth 172a of an eleventh bevel gear or second quinary shaft gear 172 coupled to the second quinary drive shaft 132.

The first quinary drive shaft 130 is directly coupled to the quaternary drive shaft 128, and comprises a low speed shaft. For example, the first quinary drive shaft 130 rotates at about 8,400 revolutions per minute (rpm). The first quinary drive shaft 130 includes the first quinary shaft gear 170, which is arranged on and coupled to a sixth body 174 of the first quinary drive shaft 130. The first quinary shaft gear 170 and the sixth body 174 are formed of a metal or metal alloy, and may be cast, machined, stamped, forged, selective metal sintered, etc. In one example, the first quinary shaft gear 170 are machined as one piece with the sixth body 174 of the first quinary drive shaft 130, however, the first quinary shaft gear 170 may be coupled to the sixth body 174 via any technique, including, but not limited to, keyway, welding, splined attachments, machined as one piece, 3D printed, etc. The sixth body 174 of the first quinary drive shaft 130 includes a first end 174a and an opposite, second end 174b. The first end 174a of the sixth body 174 is coupled to the first quinary shaft gear 170, and the second end 174b of the sixth body 174 is coupled to the lubrication pump 74 to drive the lubrication pump 74 (FIG. 2).

Generally, the first quinary shaft gear 170 is coupled to or defined on the sixth body 174 at the first end 174a. The first quinary shaft gear 170 revolves about the fifth shaft axis of rotation FR1 (FIG. 7). In this example, the first quinary shaft gear 170 comprises a bevel gear having the plurality of bevel gear teeth 170a. The plurality of bevel gear teeth 170a are defined about a perimeter or circumference of the first quinary shaft gear 170. The plurality of bevel gear teeth 170a of the first quinary shaft gear 170 is coupled to and meshingly engages with the plurality of bevel gear teeth 162a of the second quaternary shaft gear 162.

The second quinary drive shaft 132 is directly coupled to the quaternary drive shaft 128, and comprises a high speed shaft. For example, the second tertiary drive shaft 126 rotates at about 18,500 revolutions per minute (rpm). The second quinary drive shaft 132 includes the second quinary shaft gear 172, which is arranged on and coupled to a seventh body 176 of the second quinary drive shaft 132. The second quinary shaft gear 172 and the seventh body 176 are formed of a metal or metal alloy, and may be cast, machined, stamped, forged, selective metal sintered, etc. In one example, the second quinary shaft gear 172 are machined as one piece with the seventh body 176 of the second quinary drive shaft 132, however, the second quinary shaft gear 172 may be coupled to the seventh body 176 via any technique, including, but not limited to, keyway, welding, splined attachments, machined as one piece, 3D printed, etc. The seventh body 176 of the second quinary drive shaft 132 includes a first end 176a and an opposite, second end 176b. The first end 176a of the seventh body 176 is coupled to the second quinary shaft gear 172, and the second end 176b of the seventh body 176 is coupled to the DC generator 66 to drive the DC generator 66 (FIG. 2).

In one example, the second quinary shaft gear 172 is coupled to or defined on the seventh body 176 at the first end 176a. The second quinary shaft gear 172 revolves about the fifth shaft axis of rotation FR2 (FIG. 7). In this example, the second quinary shaft gear 172 comprises a bevel gear having the plurality of bevel gear teeth 172a. The plurality of bevel gear teeth 172a are defined about a perimeter or circumference of the second quinary shaft gear 172. The plurality of bevel gear teeth 172a of the second quinary shaft gear 172 is coupled to and meshingly engages with the plurality of bevel gear teeth 164a of the third quaternary shaft gear 164.

Figure 9:
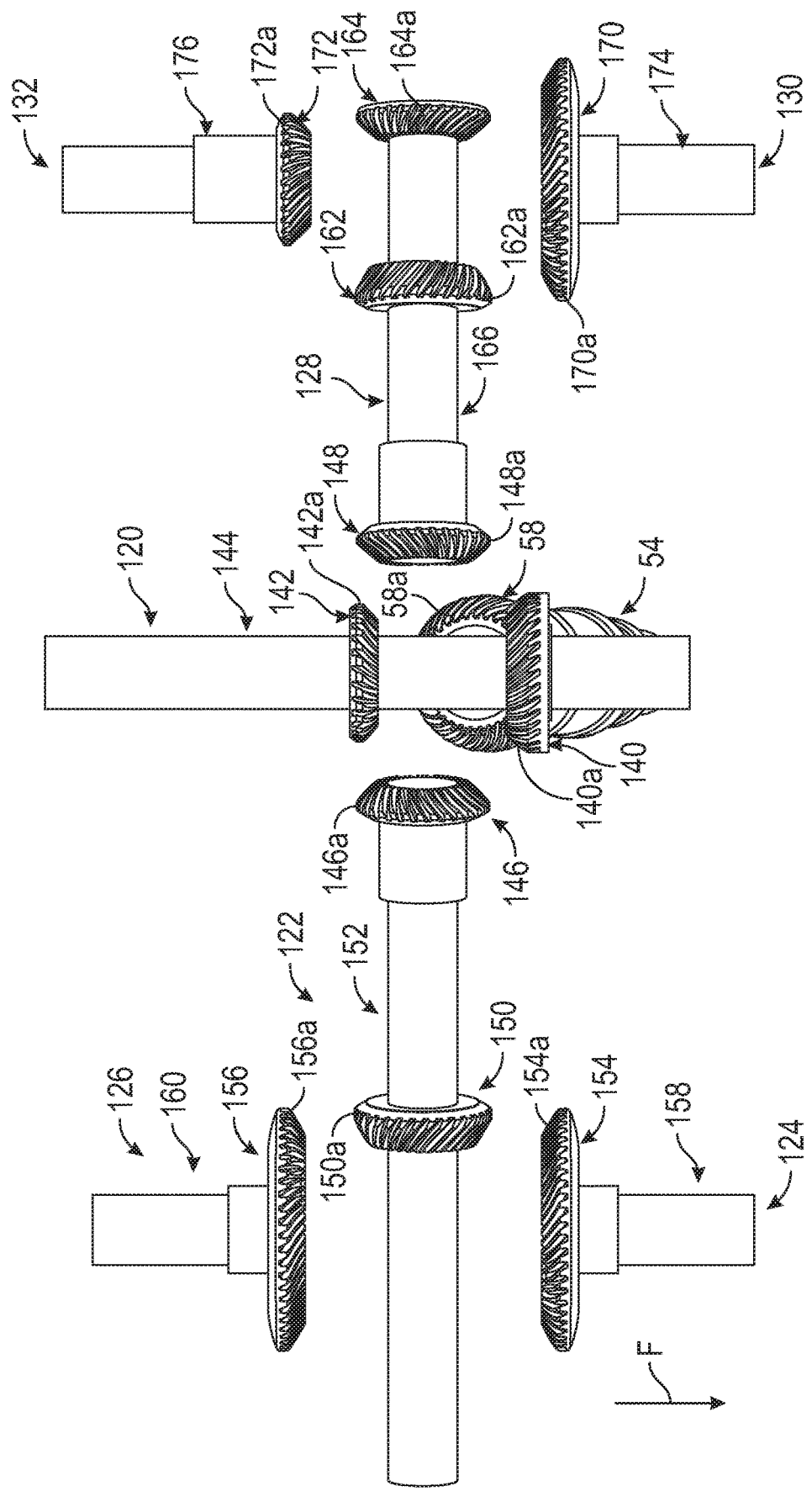
FIG. 9 is an exploded view of the gear train of FIG. 7.

With reference to FIG. 9, an exploded bottom view of the gear train 102 is shown. As shown, the first primary shaft gear 140 and the second primary shaft gear 142 are each integrally formed with the body 144 of the primary drive shaft 120. The first secondary shaft gear 146 and the second secondary shaft gear 150 are each integrally formed with the second body 152 of the secondary drive shaft 122. The first tertiary shaft gear 154 is integrally formed with the first tertiary drive shaft 124; and the second tertiary shaft gear 156 is integrally formed with the second tertiary drive shaft 126. The first quaternary shaft gear 148, the second quaternary shaft gear 162 and the third quaternary shaft gear 164 are each integrally formed with the fifth body 166 of the quaternary drive shaft 128. The first quinary shaft gear 170 is integrally formed with the first quinary drive shaft 130; and the second quinary shaft gear 172 is integrally formed with the second quinary drive shaft 132.

Figure 10:
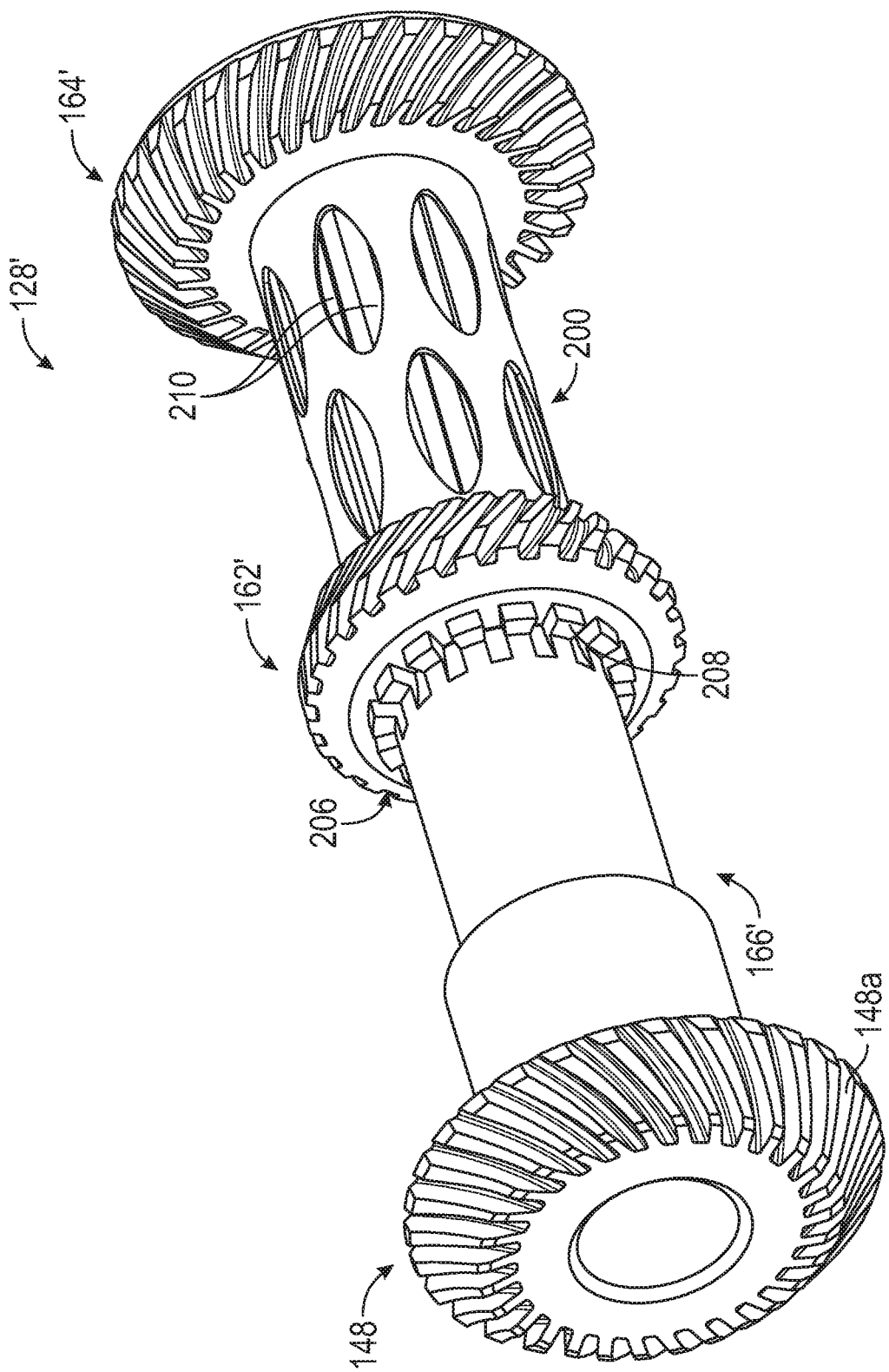
FIG. 10 is an exemplary drive shaft of the gear train of FIG. 2, in which one or more of the shaft gears of the drive shaft are coupled to the drive shaft via an exemplary splined coupling.

It should be noted that, the shaft gears 140, 142, 146, 148, 150, 154, 156, 162, 164, 170, 172 need not be integrally formed with the respective one of the drive shafts 120-132 as shown in FIGS. 7-9. Rather, with reference to FIG. 10, one or more of the shaft gears 140, 142, 146, 148, 150, 154, 156, 162, 164, 170, 172 may be coupled to the respective one of the drive shafts 120-132 via splined coupling, for example. In the example of FIG. 10, a quaternary drive shaft 128' is shown with a second quaternary shaft gear 162' and a third quaternary shaft gear 164' coupled to the quaternary drive shaft 128' via a splined coupling. As the quaternary drive shaft 128' includes components that are substantially similar to or the same as the quaternary drive shaft 128 discussed with regard to FIGS. 7-9, the same reference numerals will be used to denote similar features. It should be noted that the example of the quaternary drive shaft 128' having the quaternary shaft gears 162', 164' coupled to the quaternary drive shaft 128' via splined coupling is merely an example, as any of the shaft gears 140, 142, 146, 150, 154, 156, 170, 172 may be coupled to any of the respective drive shafts 120-126, 130, 132 via splined coupling.

Figure 11:
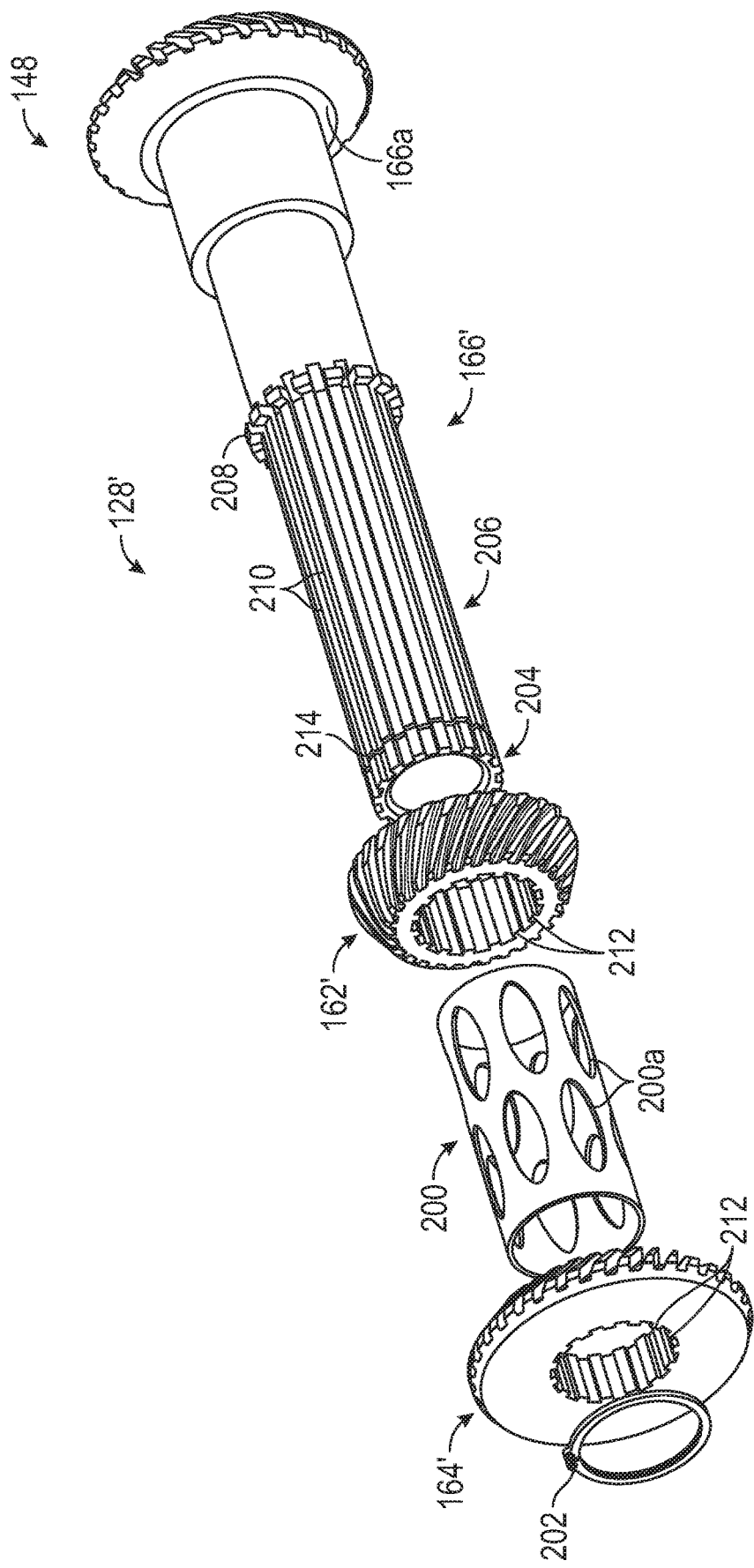
FIG. 11 is an exploded view of the exemplary drive shaft of FIG. 10.

In the example of FIG. 10, the first quaternary shaft gear 148 is integrally formed with the quaternary drive shaft 128'. In this example, the second quaternary shaft gear 162' and the third quaternary shaft gear 164' are coupled to the quaternary drive shaft 128' via a splined coupling. With reference to FIG. 11, an exploded view of the quaternary drive shaft 128' is shown. The quaternary drive shaft 128' is directly coupled to the primary drive shaft 120, and comprises a high speed shaft. In this example, the quaternary drive shaft 128' includes the first quaternary shaft gear 148, the second quaternary shaft gear 162', a spacer 200, a third quaternary shaft gear 164' and a retaining ring 202. The first quaternary shaft gear 148, the second quaternary shaft gear 162', the spacer 200, the third quaternary shaft gear 164' and the retaining ring 202 are each arranged on and coupled to a fifth body 166' of the quaternary drive shaft 128'.

The fifth body 166' of the quaternary drive shaft 128' includes the first end 166a, an opposite, second end 204 and a coupling portion 206 that extends from the second end 204 toward the first end 166a. The coupling portion 206 includes an enlarged portion 208 and a plurality of splines 210. The enlarged portion 208 is defined between the first end 166a and the second end 204, and may be defined by material removal along a remainder of the fifth body 166' toward the second end 204. In this regard, the enlarged portion 208 generally has a larger diameter than a remainder of the fifth body 166' from the enlarged portion 208 to the second end 204. The enlarged portion 208 has a diameter, which is different than a diameter of the remainder of the fifth body 166' that extends toward the second end 204. In this example, the diameter of the enlarged portion 208 is greater than the diameter of the second end 204. The enlarged portion 208 provides a stop that prevents the further advancement of the second quaternary shaft gear 162' along the fifth body 166' during assembly of the second quaternary shaft gear 162' to the fifth body 166'. Thus, the second quaternary shaft gear 162' has an inner diameter, which is less than the diameter of the enlarged portion 208.

The plurality of splines 210 are defined slightly past the enlarged portion 208 so as to extend slightly beyond the enlarged portion 208 (i.e. the plurality of splines 210 extend past the enlarged portion 208 toward the first end 166a) and through the enlarged portion 208 towards the second end 204 of the fifth body 166'. Generally, the plurality of splines 210 extend for a length along the quaternary drive shaft 128' that enables the second quaternary shaft gear 162', the spacer 200, the third quaternary shaft gear 164' and the retaining ring 202 to be coupled to the fifth body 166'. In this example, each of the second quaternary shaft gear 162' and the third quaternary shaft gear 164' include a plurality of mating splines 212. Each of the plurality of mating splines 212 cooperate with the plurality of splines 210 to couple the second quaternary shaft gear 162' and the third quaternary shaft gear 164' to the fifth body 166', while inhibiting relative rotation between the fifth body 166', the second quaternary shaft gear 162' and the third quaternary shaft gear 164'. Stated another way, the plurality of mating splines 212 and the plurality of splines 210 couple the second quaternary shaft gear 162' and the third quaternary shaft gear 164' to the fifth body 166' such that the second quaternary shaft gear 162' and the third quaternary shaft gear 164' rotate with the fifth body 166'.

The plurality of splines 210 comprise any number of splines defined about a circumference of the quaternary drive shaft 128', and may comprise a single spline, if desired. Generally, the number of splines 210 and the shape of the splines 20 are each defined in such a way to enable a desired torque transfer between components. The plurality of splines 210 are defined by machining or cutting the plurality of splines 210 into the fifth body 166', however, the plurality of splines 210 may be formed through any desired technique. The plurality of mating splines 212 may be defined along an inner diameter of each of the second quaternary shaft gear 162' and the third quaternary shaft gear 164' during the formation of the second quaternary shaft gear 162' and the third quaternary shaft gear 164'. Generally, the plurality of mating splines 212 extend along an entirety of the inner diameter of each of the second quaternary shaft gear 162' and the third quaternary shaft gear 164' to facilitate the advancement of each of the second quaternary shaft gear 162' and the third quaternary shaft gear 164' along the coupling portion 206. It should be noted that while the second quaternary shaft gear 162' and the third quaternary shaft gear 164' are each described herein as including the plurality of mating splines 192, the second quaternary shaft gear 162' and the third quaternary shaft gear 164' may include any number of mating splines 212 that cooperate to couple the second quaternary shaft gear 162' and the third quaternary shaft gear 164' to the fifth body 166'. Moreover, the plurality of mating splines 212 may be formed to have an interference fit with the plurality of splines 210, if desired. Generally, the plurality of splines 210 and the plurality of mating splines 212 each have the same shape, form and the same number of corresponding splines.

The second quaternary shaft gear 162', the third quaternary shaft gear 164' and the fifth body 166' are formed of a metal or metal alloy, and may be cast, machined, stamped, forged, selective metal sintered, etc. Generally, the first quaternary shaft gear 148 is coupled to or defined on the fifth body 166' at the first end 166a, and the third quaternary shaft gear 164' is coupled to the plurality of splines 210 of the fifth body 166' at the second end 204. The second quaternary shaft gear 162' is coupled to the plurality of splines 210 of the fifth body 166' between the spacer 200 and the enlarged portion 208. The first quaternary shaft gear 148, the second quaternary shaft gear 162' and the third quaternary shaft gear 164' each revolve about the fourth shaft axis of rotation QR (FIG. 7) of the quaternary drive shaft 128'. The second quaternary shaft gear 162' and the third quaternary shaft gear 164' each comprise bevel gears having the respective plurality of bevel gear teeth 162a, 164a, which are coupled to and meshingly engage with the respective plurality of bevel gear teeth 170a, 172a of the respective one of the quinary drive shafts 130, 132, as discussed previously herein.

The spacer 200 is positioned between the second quaternary shaft gear 162' and the third quaternary shaft gear 164' along the quaternary drive shaft 128'. The spacer 200 includes a plurality of openings 200a defined about a circumference of the spacer 200, which provide a mass savings. The spacer 200 maintains a separation distance between the second quaternary shaft gear 162' and the third quaternary shaft gear 164' on the fifth body 166' of the quaternary drive shaft 128'. The spacer 200 is formed of a metal or metal alloy, and may be cast, stamped, rolled, selective metal sintered, forged, or otherwise formed.

The retaining ring 202 secures the third quaternary shaft gear 164', and thus, the second quaternary shaft gear 162' and the spacer 200, on the fifth body 166' of the quaternary drive shaft 128'. In one example, the retaining ring 202 is received within a groove 214 defined in the plurality of splines and in the fifth body 166' about a circumference of the fifth body 166'. The retaining ring 202 may comprise any suitable retaining device, such as a metal or metal alloy circular retaining ring.

In order to assemble the quaternary drive shaft 128', in one example, the fifth body 166' is formed with the first quaternary shaft gear 148 coupled to the first end 166a, and the plurality of splines 210 defined on the fifth body 166' from the second end 204 toward the first end 166a. The enlarged portion 208 is also formed on the fifth body 166', between the first end 166a and the second end 204. The second quaternary shaft gear 162' and the third quaternary shaft gear 164' are formed, and the plurality of mating splines 212 are defined within an inner diameter of a central bore of each of the second quaternary shaft gear 162' and the third quaternary shaft gear 164'. The second quaternary shaft gear 162' is positioned onto the fifth body 166' and moved until the second quaternary shaft gear 162' abuts the enlarged portion 208. With the spacer 200 formed, the spacer 200 is positioned over the fifth body 166' adjacent to the second quaternary shaft gear 162'. The third quaternary shaft gear 164' is positioned onto the second end 204 of the fifth body 166' and the retaining ring 202 is positioned within the groove 214 to retain the third quaternary shaft gear 164' on the quaternary drive shaft 128'.

Figure 12:
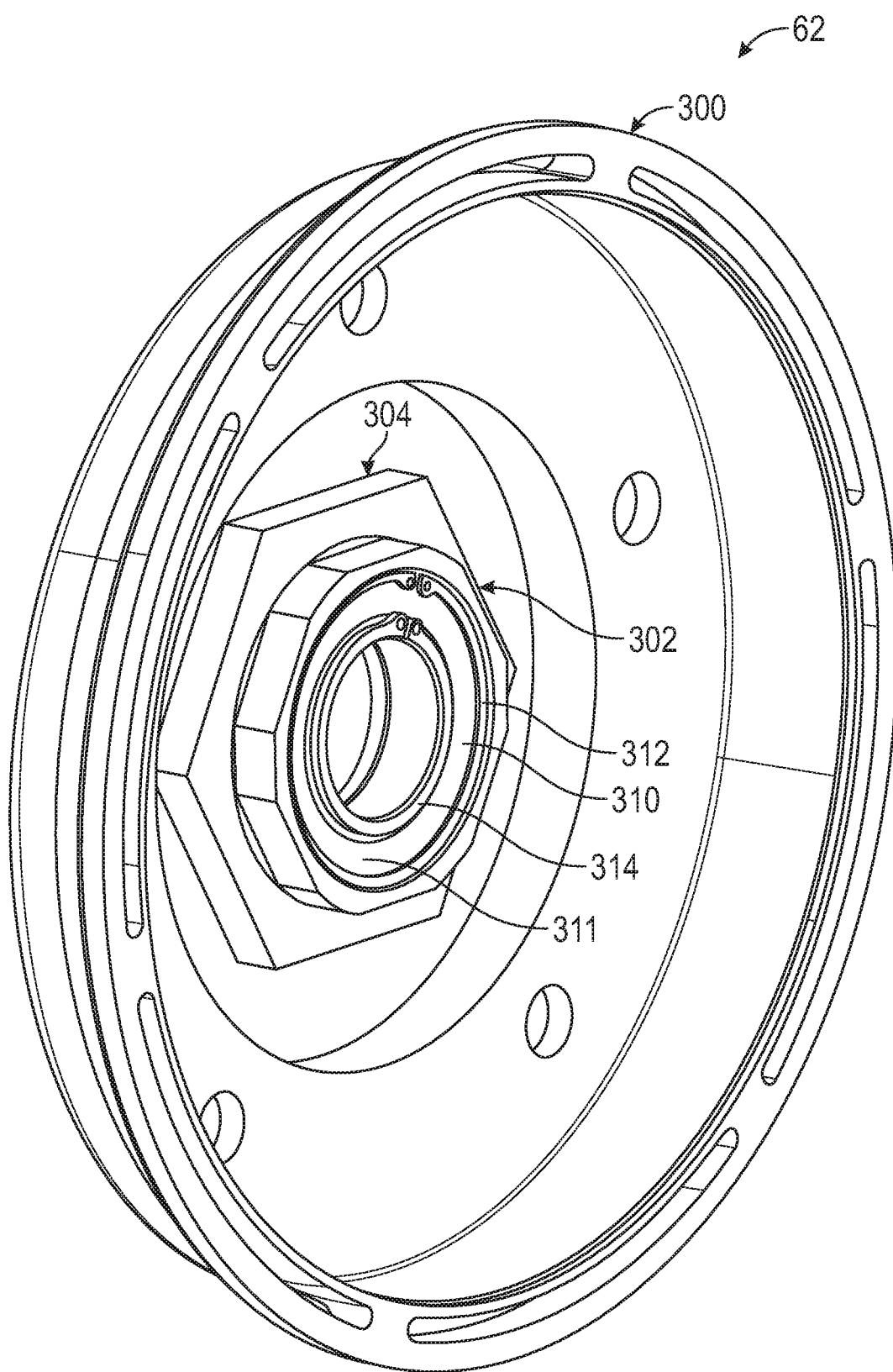
FIG. 12 is a perspective view of one of a plurality of exemplary adapters for use with the compact accessory gearbox of FIG. 2.

With reference to FIG. 12, one of the adapters 62 is shown. Generally, the adapters 62 couple a respective one of the accessories 64-68 and 72 to a respective one of the drive shafts 120, 124, 126, 132. For example, one of the adapters 62 couple the starter turbine 64 (FIG. 2) to the primary drive shaft 120 (FIG. 7). Another one of the adapters 62 couple the DC generator 66 (FIG. 2) to the second quinary drive shaft 132 (FIG. 7). One of the adapters 62 couple the hydraulic pump 68 (FIG. 2) to the first tertiary drive shaft 124 (FIG. 7). Another one of the adapters 62 couple the fuel control unit 72 (FIG. 2) to the second tertiary drive shaft 126 (FIG. 7). The adapters 62 enable a contact pattern between mating shaft gears to be adjusted to compensate for manufacturing tolerances, for example. In this example, the adapter 62 coupled to the starter turbine 64 enables a contact pattern between the plurality of bevel gear teeth 140a of the first primary shaft gear 140 to be adjusted laterally (fore and aft) within the gear case 100 relative to the plurality of bevel gear teeth 58a of the towershaft 54. The adapter 62 coupled to the DC generator 66 enables a contact pattern between the plurality of bevel gear teeth 172a of the second quinary shaft gear 172 to be adjusted laterally (fore and aft) within the gear case 100 relative to the plurality of bevel gear teeth 164a of the third quaternary shaft gear 164. The adapter 62 coupled to the hydraulic pump 68 enables a contact pattern between the plurality of bevel gear teeth 154a of the first tertiary shaft gear 154 to be adjusted laterally (fore and aft) within the gear case 100 relative to the plurality of bevel gear teeth 150a of the second secondary shaft gear 150. The adapter 62 coupled to the fuel control unit 72 enables a contact pattern between the plurality of bevel gear teeth 156a of the second tertiary shaft gear 156 to be adjusted laterally (fore and aft) within the gear case 100 relative to the plurality of bevel gear teeth 150a of the second secondary shaft gear 150.

Figure 13:
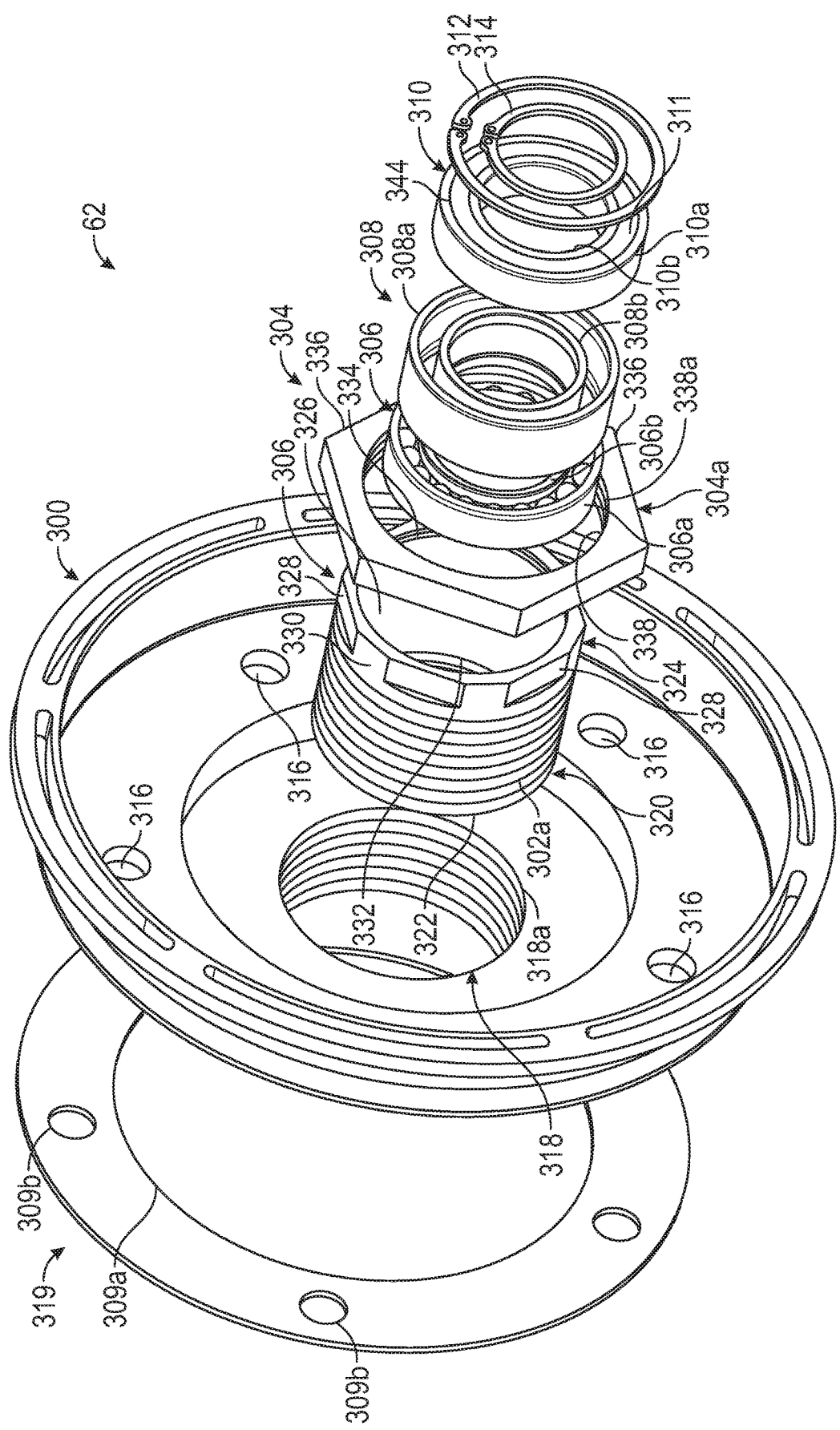
FIG. 13 is an exploded view of the adapter of FIG. 12.

As each of the adapters 62 are the same, a single one of the adapters 62 will be discussed in detail herein. As shown in FIG. 12, the adapter 62 includes an accessory mount or mount interface 300, a lock cylinder 302, a lock nut 304, a first bearing 306, one or more bearing spacers 308, a second bearing 310, a first retaining ring 312 and a second retaining ring 314. The lock cylinder 302 and the lock nut 304 cooperate to define a lock that enables an infinitely fine adjustment within a range of the contact pattern. Each of the mount interface 300, the lock cylinder 302, the lock nut 304, the one or more bearing spacers 308, the first retaining ring 312 and the second retaining ring 314 are composed of a metal or metal alloy, and may be formed via stamping, casting, forging, selective metal sintering, lathe machining, etc. With reference to FIG. 13, the mount interface 300 includes a first plurality of mounting bores 316 and a central bore 318. The plurality of mounting bores 316 are spaced apart along a perimeter or circumference of the mount interface 300. In one example, a mounting fastener (not shown) may be received in each of the mounting bores 316 to couple the adapter 62 to the respective accessory 64-68, 72. While not illustrated herein for clarity, the mounting fasteners comprise any suitable coupling device for coupling the accessory 64-68 and 72 to the adapter 62, including, but not limited to, a mechanical fastener assembly, etc. The central bore 318 of the mount interface 300 is substantially cylindrical, and is sized to receive the lock cylinder 302. In on example, the central bore 318 includes a plurality of threads 318a. The plurality of threads 318a matingly engages with a plurality of threads 302a of the lock cylinder 302 to couple the lock cylinder 302 to the mount interface 300. The mount interface 300 also generally includes a gasket or seal 319, which provides a seal between the mount interface 300 and the gear case 100 when the adapter 62 is coupled to the gear case 100. The seal 319 may be composed of any suitable polymeric material, and may include a central gasket bore 319a, which enables the respective drive shaft 120, 124, 126, 132 to pass therethrough. The seal 319 may also include one or more gasket mounting bores 319b, which are positioned to correspond to a respective one of the mounting bores 316 of the mount interface 300.

The lock cylinder 302 includes the plurality of threads 302a defined about an exterior surface 320 of the lock cylinder 302. The lock cylinder 302 also includes a first end 322 opposite a second end 324, and an interior surface 326 opposite the exterior surface 320. The plurality of threads 302a generally extends along the exterior surface 320 from the first end 322 toward the second end 324. The exterior surface 320 includes a plurality of alternating flats 328 defined at the second end 324. Generally, the flats 328 are defined in the exterior surface 320 about the perimeter of the lock cylinder 302 in an alternating pattern such that each flat 328 is circumferentially separated from another flat 328 by a portion 330 of the exterior surface 320. This alternating pattern of flats 328 provides a graspable surface that enables the lock cylinder 302 to be manipulated or rotated relative to or within the central bore 318 to move the lock cylinder 302 within the central bore 318. The rotational movement of the lock cylinder 302 translates the respective drive shaft 120, 124, 126, 132 within the gear case 100 to adjust the contact pattern between the respective gears 58, 140; 150, 154; 150, 156; 164, 172.

With reference to FIG. 13, the interior surface 326 is substantially smooth, and includes a lip 332 at the first end 322 and a retaining groove 334 at the second end 324. The lip 332 extends radially inward to retain the first bearing 306 within the lock cylinder 302. The retaining groove 334 is defined within the interior surface 326 and receives the first retaining ring 312 to couple the first bearing 306, the one or more bearing spacers 308 and the second bearing 310 to the lock cylinder 302.

With reference back to FIG. 13, the lock nut 304 is substantially hexagonal, and defines a plurality of flats 336 about an exterior surface 304a. The plurality of flats 336 defines a graspable surface that enables the lock nut 304 to be manipulated or rotated relative to the lock cylinder 302. The lock nut 304 also defines a central lock bore 338. The central lock bore 338 includes a plurality of threads 338a, which cooperate with the plurality of threads 302a defined about the lock cylinder 302 to couple the lock nut 304 to the lock cylinder 302.

The first bearing 306 and the second bearing 310 are received within the lock cylinder 302. The first bearing 306 and the second bearing 310 enable the rotation of the respective drive shaft 120, 124, 126, 132 to transfer torque to the respective one of the accessories 64-68, 72. The first bearing 306 and the second bearing 310 are generally ball bearings or a combination of roller and ball bearings that cooperate to receive a portion of the drive shaft 120, 124, 126, 132 therethrough to enable the respective drive shaft 120, 124, 126, 132 to rotate relative to the gear case 100. The second bearing 310 generally includes a seal 311. Generally, the first bearing 306 does not include a seal. By not including a seal with the first bearing 306, oil contained within the gear case 100 may lubricate both the first bearing 306 and the second bearing 310, while the seal 311 of the second bearing 310 prevents the leakage of oil outside of the compact accessory gearbox 60.

The one or more bearing spacers 308 maintain a separation distance between the first bearing 306 and the second bearing 310. In one example, the one or more bearing spacers 308 comprise a first bearing spacer 308a and a second bearing spacer 308b. The bearing spacers 308 are substantially cylindrical, and in this example, the first bearing spacer 308a has a diameter that is greater than a diameter of the second bearing spacer 308b. The first bearing spacer 308a generally bears against an outer race 306a, 310a of each of the first bearing 306 and the second bearing 310, while the second bearing spacer 308b generally bears against an inner race 306b, 310b of each of the first bearing 306 and the second bearing 310.

The first retaining ring 312 is received within the retaining groove 334 and couples the second bearing 310, the bearing spacers 308a, 308b and the first bearing 306 to the lock cylinder 302. Generally, the first retaining ring 312 is coupled to or contacts an outer surface 344 of the outer race 310a of the second bearing 310 to retain the second bearing 310, the bearing spacers 308a, 308b and the first bearing 306 within the lock cylinder 302.

Figure 14:
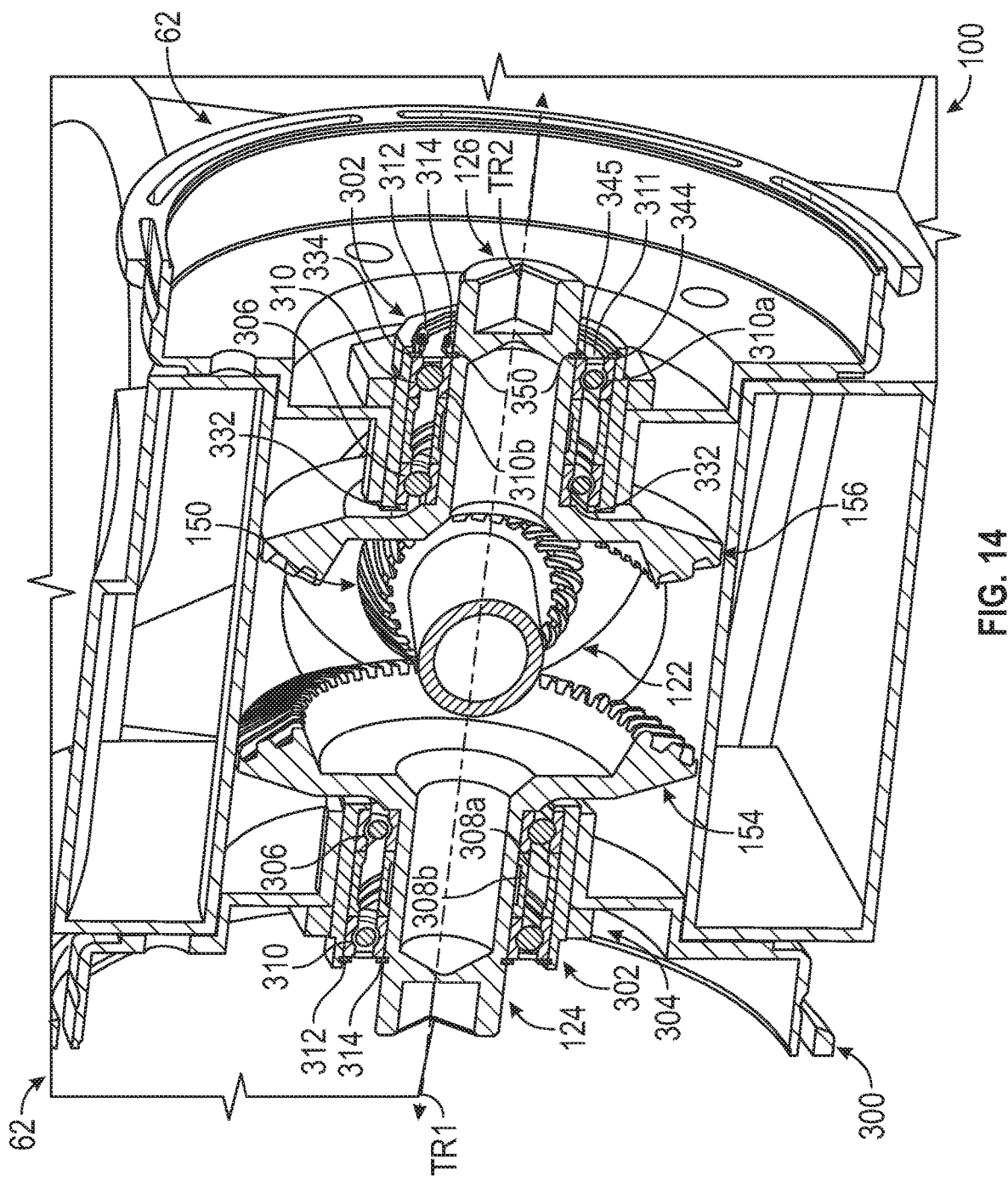
FIG. 14 is a cross-sectional view of the adapter of FIG. 12 coupled to a portion of the gear train of the compact accessory gearbox of FIG. 2, taken along line 14-14 of FIG. 4.

With reference to FIG. 14, the second retaining ring 314 is received within a groove 350 defined on the respective drive shaft 120, 124, 126, 132. The second retaining ring 314 couples the second bearing 310, the bearing spacers 308a, 308b and the first bearing 306 to the respective drive shaft 120, 124, 126, 132. Generally, the second retaining ring 314 is coupled to or contacts an outer surface 345 of the inner race 310b of the second bearing 310 to retain the second bearing 310, the bearing spacers 308a, 308b and the first bearing 306 coupled to the respective drive shaft 120, 124, 126, 132.

In order to assemble the adapter 62, in one example, with the mount interface 300, the lock cylinder 302, the lock nut 304, the bearing spacers 308a, 308b, the first retaining ring 312 and the second retaining ring 314 formed, the plurality of threads 302a on the lock cylinder 302 are threadably engaged with the plurality of threads 318a of the central bore 318. With the first bearing 306 and the second bearing 310 assembled, the first bearing 306 is positioned within the lock cylinder 302, and the bearing spacers 308a, 308b are positioned within the lock cylinder 302. The second bearing 310 is positioned within the lock cylinder 302, and the first retaining ring 312 is inserted into the retaining groove 334 of the lock cylinder 302 to secure the assembly of the first bearing 306, the bearing spacers 308a, 308b and the second bearing 310 within the lock cylinder 302.

With the assembly of the first bearing 306, the bearing spacers 308a, 308b and the second bearing 310 secured within the lock cylinder 302, the adapter 62 may be coupled to a respective one of the drive shafts 120, 124, 126, 132. Generally, the adapter 62 is coupled to the end 144a, 158b, 160b, 176b of the respective one of the drive shafts 120, 124, 126, 132 once the drive shaft 120, 124, 126, 132 is positioned within the gear case 100 and the end 144a, 158b, 160b, 176b extends through the respective aperture 108. Once the adapter 62 is positioned about the respective drive shaft 120, 124, 126, 132, the second retaining ring 314 is positioned within the groove 350 defined on the respective drive shaft 120, 124, 126, 132 to couple the adapter 62 to the drive shaft 120, 124, 126, 132. The plurality of mounting bores 316 of the mount interface 300 may receive the mechanical fasteners to couple the mount interface 300 to the respective accessory 64-72.

It will be understood that the adapter 62 described with regard to FIGS. 1-14 may be configured differently to enable an adjustment of a contact pattern between the respective gears 58, 140; 150, 154; 150, 156; 164, 172. In one example, with reference to FIG. 15, a bearing housing assembly or adapter 62' is shown. As the adapter 62' includes components that are substantially similar to or the same as the adapter 62 discussed with regard to FIGS. 1-14, the same reference numerals will be used to denote similar features.

Figure 15:
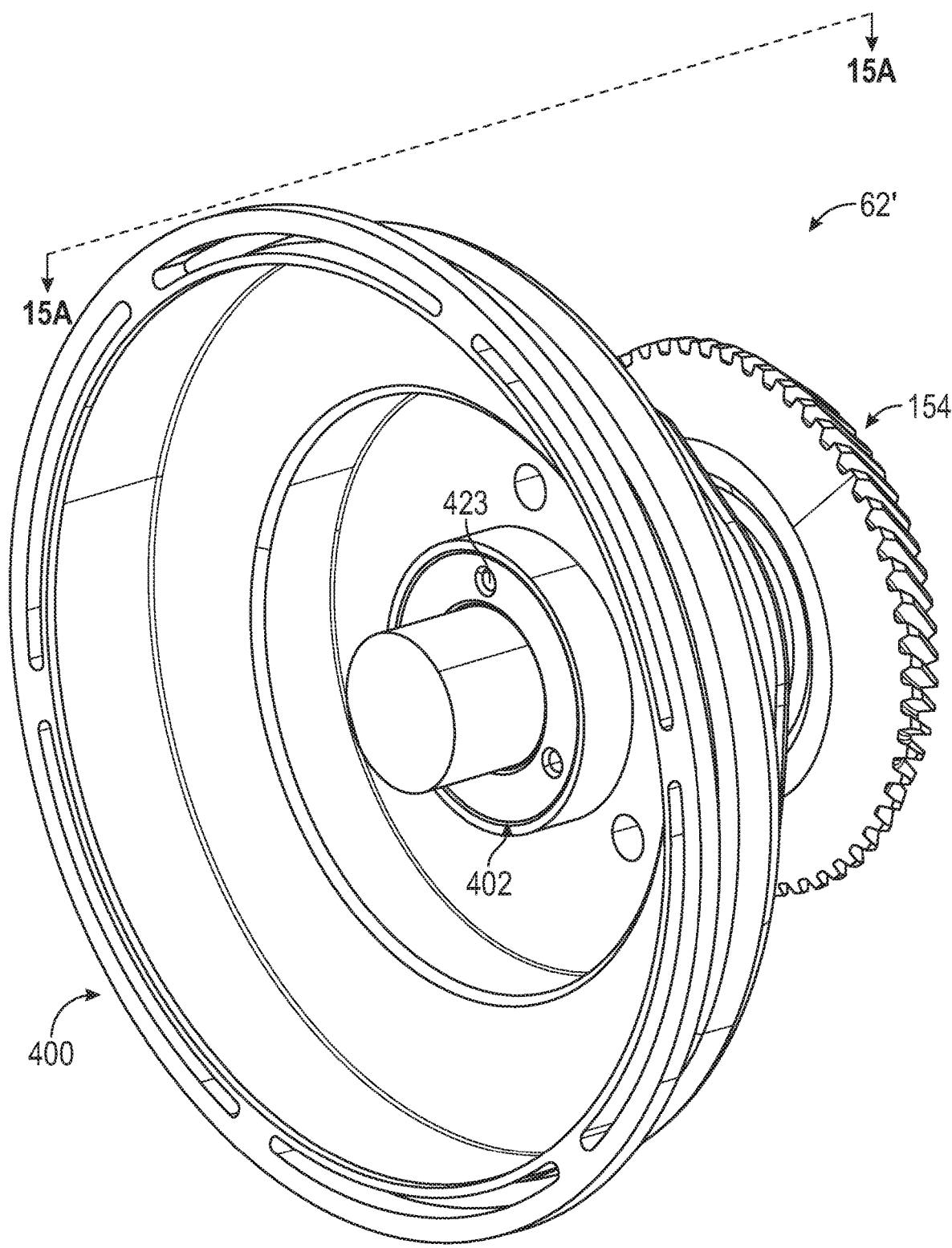
FIG. 15 is a perspective view of one of another plurality of adapters for use with a portion of the gear train of the compact accessory gearbox of FIG. 2.
Figure 15A:
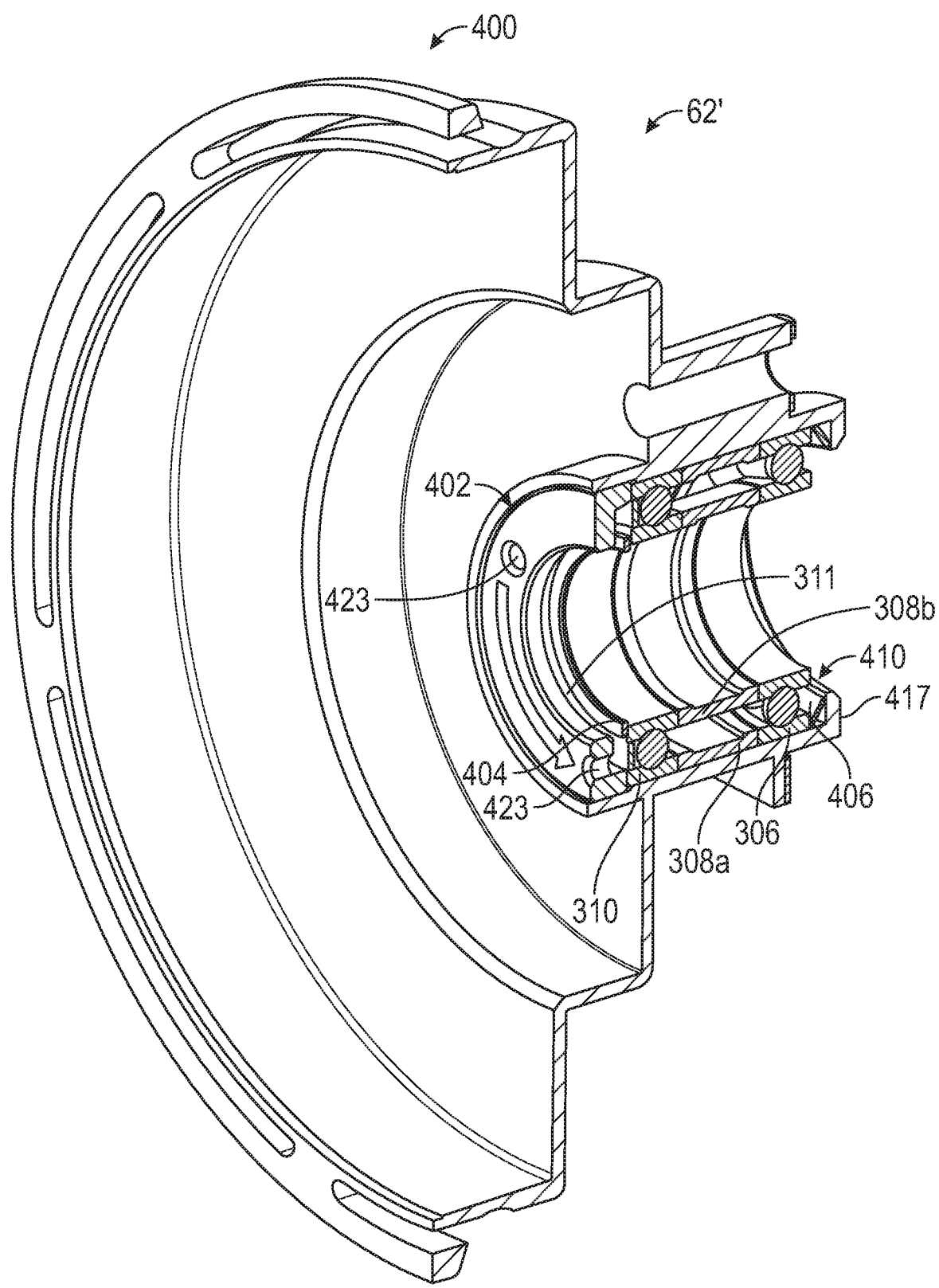
FIG. 15A is a cross-sectional view the adapter of FIG. 15, taken along the perspective of line 15A-15A of FIG. 15, with the portion of the gear train removed for clarity.
Figure 16:
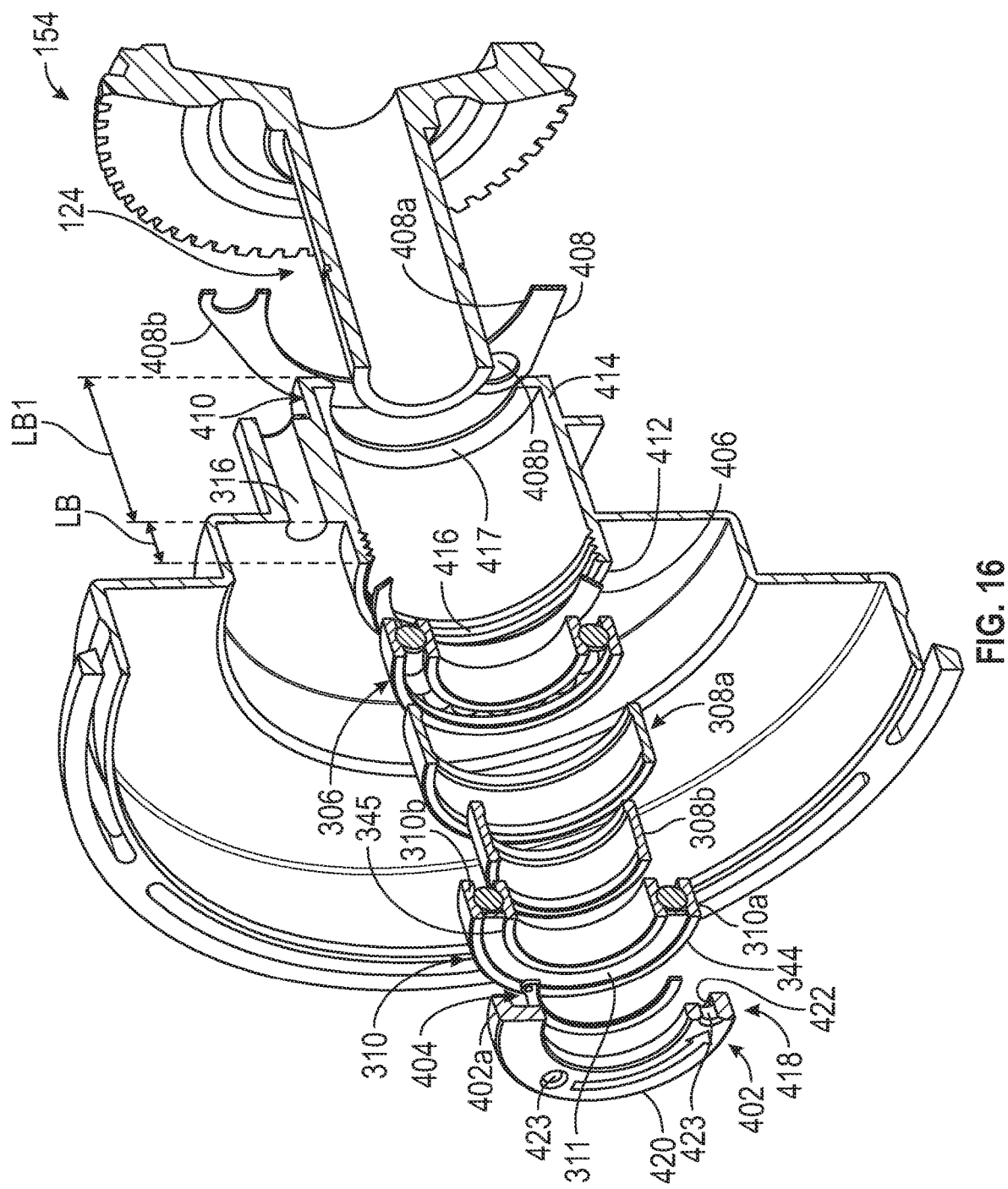
FIG. 16 is a cross-sectional exploded view of the adapter of FIG. 15, which includes the portion of the gear train exploded from the adapter, taken from the perspective of line 15A-15A of FIG. 15.

As shown in FIG. 15A, the adapter 62' includes an accessory mount or mount interface 400, a lock ring 402, a retaining ring 404, the first bearing 306, the bearing spacers 308a, 308b, the second bearing 310, a washer or spring washer 406 and a gasket 408. The lock ring 402 defines a lock that enables an adjustment of the contact pattern. Each of the mount interface 400, the lock ring 402, the retaining ring 404 and the spring washer 406 are composed of a metal or metal alloy, and may be formed via stamping, casting, forging, selective metal sintering, etc. With reference to FIG. 15, the mount interface 400 includes the plurality of mounting bores 316 and a central bore 410. With reference to FIG. 16, the central bore 410 of the mount interface 300 is substantially cylindrical, and includes a first end 412 opposite a second end 414. The central bore 410 also includes a plurality of threads 416 defined along a portion of the central bore 410 at the first end 412. Generally, the plurality of threads 416 are defined from the first end 412 toward the second end 414 for a length LB, which is less than a length LB1 of a reminder of the central bore 410. The plurality of threads 416 cooperate with a plurality of threads 402a defined on the lock ring 402. The second end 414 of the central bore 410 includes a flange 417, which extends radially inward. The flange 417 retains the spring washer 406 within the central bore 410.

The lock ring 402 includes the plurality of threads 402a defined about an exterior surface 418 of the lock ring 402. The plurality of threads 420a may comprise left-hand threads or right-hand threads depending on the rotation of the respective drive shaft 120, 124, 126, 132. The lock ring 402 also includes a first side 420 opposite a second side 422, and a plurality of bores 423 defined through the lock ring 402 from the first side 420 to the second side 422. The plurality of threads 402a generally extends along the exterior surface 418 from the first side 420 toward the second side 422. The first side 420 may include one or more descriptive markings, such as a textual marking or graphical indicator, which instructs an operator how to adjust the contact pattern with the adapter 62'. The second side 422 defines an annular recess that ensures that the lock ring 402 does not bear against the ball bearings or rollers of the second bearing 310. Rather, the second side 422 generally bears against the outer surface 344 of the outer race 310a of the second bearing 310. The plurality of bores 423 each provide an opening for an implement or tool, which may be manipulated by the operator to rotate the lock ring 402 relative to the central bore 410.

Figure 17:
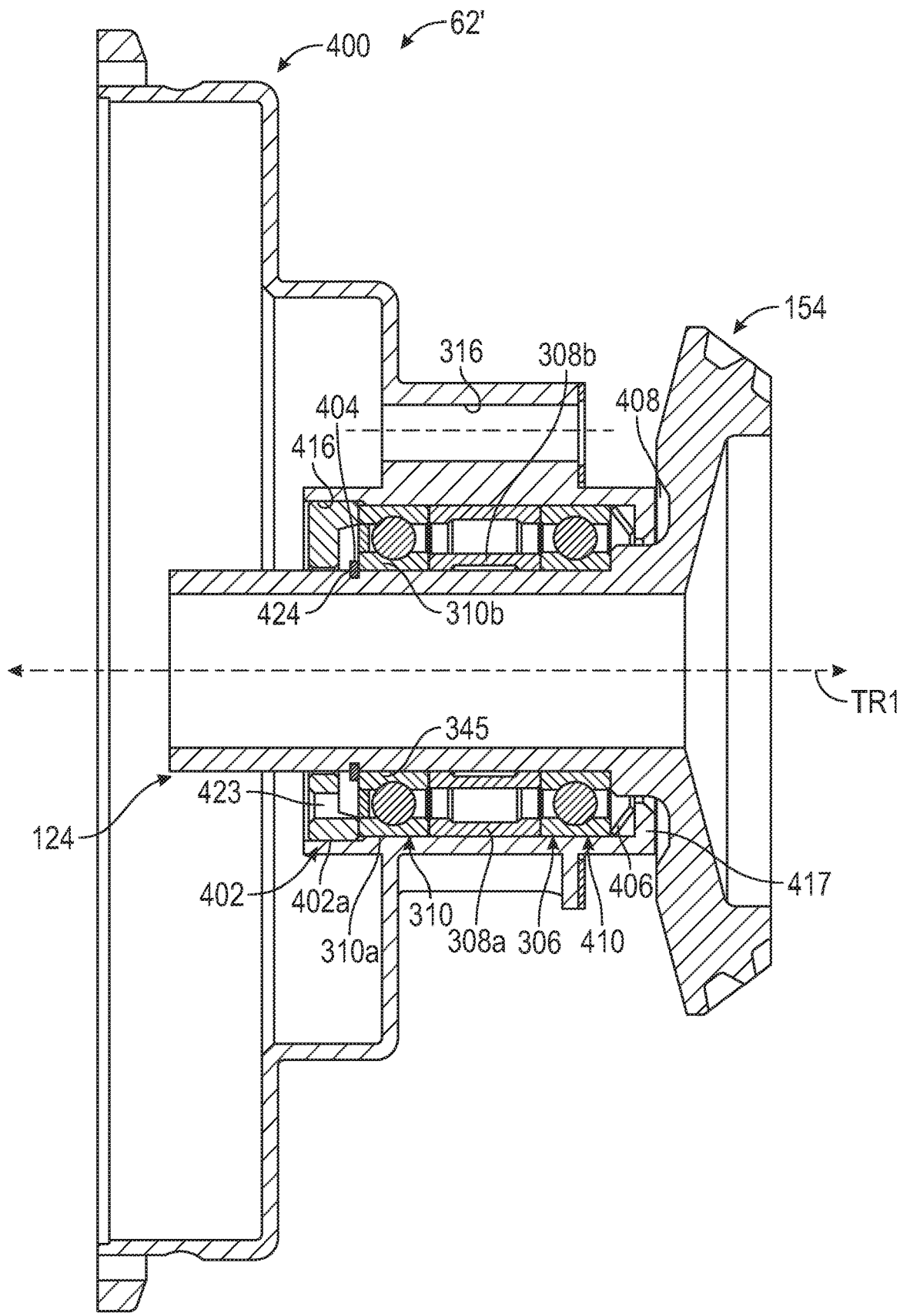
FIG. 17 is a cross-sectional view of the adapter of FIG. 15, taken along line 15A-15A of FIG. 15, which illustrates the adapter coupled to a portion of the gear train of the compact accessory gearbox of FIG. 2.

With reference to FIG. 17, the retaining ring 404 is received within a groove 424 defined on the respective drive shaft 120, 124, 126, 132. The retaining ring 404 couples the second bearing 310, the bearing spacers 308a, 308b and the first bearing 306 to the respective drive shaft 120, 124, 126, 132. Generally, the retaining ring 404 is coupled to or contacts the outer surface 345 of the outer race 310a of the second bearing 310 to retain the second bearing 310, the bearing spacers 308a, 308b and the first bearing 306 coupled to the respective drive shaft 120, 124, 126, 132.

The spring washer 406 is positioned between the first bearing 306 and the flange 417. The spring washer 406 is a Belleville washer or wavy washer, and provides a spring force or preload against the assembly of the bearings 306, 310, the bearing spacers 308a, 308b and the lock ring 402.

The gasket 408 provides a seal between the mount interface 400 and the gear case 100 when the adapter 62' is coupled to the gear case 100. The gasket 408 may be composed of any suitable polymeric material, and may include a central gasket bore 408a, which enables the respective drive shaft 120, 124, 126, 132 to pass therethrough. The gasket 408 may also include one or more gasket mounting bores 408b, which are positioned to correspond to a respective one of the mounting bores 316 of the mount interface 400.

In order to assemble the adapter 62', in one example, with the mount interface 400, the lock ring 402, the retaining ring 404, the spring washer 406, the bearing spacers 308a, 308b and the gasket 408 formed, the spring washer 406 is positioned within the central bore 410 of the mount interface 400 such that the spring washer 406 abuts or is adjacent to the flange 417. With the first bearing 306 and the second bearing 310 assembled, the first bearing 306 is positioned within the central bore 410 adjacent to the spring washer 406, and the bearing spacers 308a, 308b are positioned within the central bore 410. The second bearing 310 is positioned within the central bore 410.

With the assembly of the first bearing 306, the bearing spacers 308a, 308b and the second bearing 310 positioned within the central bore 410, the adapter 62' may be coupled to a respective one of the drive shafts 120, 124, 126, 132. Generally, the adapter 62 is coupled to the end 144a, 158b, 160b, 176b of the respective one of the drive shafts 120, 124, 126, 132 once the drive shaft 120, 124, 126, 132 is positioned within the gear case 100 and the end 144a, 158b, 160b, 176b extends through the respective aperture 108. Once the adapter 62' is positioned about the respective drive shaft 120, 124, 126, 132, the second retaining ring 314 is positioned within the groove 424 defined on the respective drive shaft 120, 124, 126, 132 to couple the adapter 62' to the drive shaft 120, 124, 126, 132. The plurality of threads 402a on the lock ring 402 are threadably engaged with the plurality of threads 416 of the central bore 410, and the plurality of bores 423 of the lock ring 402 may be used to advance or retract the respective drive shaft 120, 124, 126, 132 to adjust the contact pattern between the corresponding gears 58, 140; 150, 154; 150, 156; 164, 172. The gasket 408 is positioned between the plurality of mounting bores 316 of the mount interface 300 and the respective accessory 64-72. The plurality of mounting bores 316, and the associated gasket mounting bore 408b, may receive the mechanical fasteners to couple the mount interface 400 to the respective accessory 64-68, 72.

In one example, in order to assemble the compact accessory gearbox 60, with reference to FIG. 7, the primary drive shaft 120, the secondary drive shaft 122, the first tertiary drive shaft 124, the second tertiary drive shaft 126, the quaternary drive shaft 128, the first quinary drive shaft 130 and the second quinary drive shaft 132 formed with the respective shaft gears 140, 142, 146, 148, 150, 154, 156, 162, 164, 170, 176, and the two portions 104, 106 of the gear case 100 (FIG. 6) formed, the primary drive shaft 120 is positioned within the first portion 104 of the gear case 100. With the primary drive shaft 120 positioned within the first portion 104 of the gear case 100, one of the adapters 62, 62' is coupled to the primary drive shaft 120. With one of the adapters 62, 62' coupled to the first end 144a of the primary drive shaft 120, the contact pattern between the first primary shaft gear 140 and the gear 58 associated with the towershaft 54 is adjustable. In the example of the adapter 62 coupled to the primary drive shaft 120 via the second retaining ring 314, the lock nut 304 may be rotated to lock the lock cylinder 302, and thus, the primary drive shaft 120, at the desired position for the first primary shaft gear 140. In the example of the adapter 62' coupled to the primary drive shaft 120 via the retaining ring 404, the lock ring 402 may be rotated to lock the primary drive shaft 120 at the desired position for the first primary shaft gear 140.

The secondary drive shaft 122 is positioned within the first portion 104 of the gear case 100 such that the first secondary shaft gear 146 meshingly engages with the second primary shaft gear 142. The quaternary drive shaft 128 is positioned within the gear case 100 such that the first quaternary shaft gear 148 meshingly engages with the second primary shaft gear 142. The first tertiary drive shaft 124 is positioned within the gear case 100 (FIG. 3), and one of the adapters 62, 62' is coupled to the first tertiary drive shaft 124. With one of the adapters 62, 62' coupled to the second end 158b of the first tertiary drive shaft 124, the contact pattern between the first tertiary shaft gear 154 and the second secondary shaft gear 150 is adjustable. In the example of the adapter 62 coupled to the first tertiary drive shaft 124 via the second retaining ring 314, the lock nut 304 may be rotated to lock the lock cylinder 302, and thus, the first tertiary drive shaft 124, at the desired position for the first tertiary shaft gear 154. In the example of the adapter 62' coupled to the first tertiary drive shaft 124 via the retaining ring 404, the lock ring 402 may be rotated to lock the first tertiary drive shaft 124 at the desired position for the first tertiary shaft gear 154.

The second tertiary drive shaft 126 is positioned within the gear case 100 (FIG. 3), and one of the adapters 62, 62' is coupled to the second tertiary drive shaft 126. With one of the adapters 62, 62' coupled to the second end 160b of the second tertiary drive shaft 126, the contact pattern between the second tertiary shaft gear 156 and the second secondary shaft gear 150 is adjustable. In the example of the adapter 62 coupled to the second tertiary drive shaft 126 via the second retaining ring 314, the lock nut 304 may be rotated to lock the lock cylinder 302, and thus, the second tertiary drive shaft 126, at the desired position for the second tertiary shaft gear 156. In the example of the adapter 62' coupled to the second tertiary drive shaft 126 via the retaining ring 404, the lock ring 402 may be rotated to lock the second tertiary drive shaft 126 at the desired position for the first tertiary shaft gear 154.

The first quinary drive shaft 130 is positioned within the gear case 100 (FIG. 3) such that the first quinary shaft gear 170 meshingly engages with the second quaternary shaft gear 162. The second quinary drive shaft 132 is positioned within the gear case 100 (FIG. 3), and one of the adapters 62, 62' is coupled to the second quinary drive shaft 132. With one of the adapters 62, 62' coupled to the second end 176b of the second quinary drive shaft 132, the contact pattern between the second quinary shaft gear 172 and the third quaternary shaft gear 164 is adjustable. In the example of the adapter 62 coupled to the second quinary drive shaft 132 via the second retaining ring 314, the lock nut 304 may be rotated to lock the lock cylinder 302, and thus, the second quinary drive shaft 132, at the desired position for the second quinary drive shaft 132. In the example of the adapter 62' coupled to the second quinary drive shaft 132 via the retaining ring 404, the lock ring 402 may be rotated to lock the second quinary drive shaft 132 at the desired position for the second quinary drive shaft 132.

With the gear train 102 positioned within the gear case 100, the second portion 106 is coupled to the first portion 104 to enclose the gear train 102. The gear case 100 may be positioned within the nacelle N (FIG. 1) such that the first primary shaft gear 140 meshingly engages with the gear 58 associated with the towershaft 54. With the gear case 100 assembled within the nacelle N, the gear case 100 may be secured via the struts. The accessories 64-82 may be coupled to the respective drive shafts 120, 122, 124, 126, 130, 132, and the gear case 100 may be coupled to the oil tank to provide oil to the first volume 114 (FIG. 3). In one example, the accessories 64-72 may each be coupled to the respective adapter 62, 62', and the accessories 70, 74-82 may be coupled to the gear case 100.

In one example, with the high pressure driveshaft 46 driving or rotating the towershaft 54 about the towershaft axis of rotation TR (FIG. 1), the torque from the high pressure driveshaft 46 is transmitted through the towershaft 54 and into the gear train 102 via the meshing engagement of the gear 58 with the first primary shaft gear 140. With reference to FIG. 7, the rotation of the towershaft 54 rotates the primary drive shaft 120 about the shaft axis of rotation PR. The rotation of the primary drive shaft 120 drives or rotates the secondary drive shaft 122 (via the engagement between the second primary shaft gear 142 and the first secondary shaft gear 146) and also drives the quaternary drive shaft 128 (via the engagement between the second primary shaft gear 142 and the first quaternary shaft gear 148). The rotation of the secondary drive shaft 122 drives the first tertiary drive shaft 124 (via the engagement between the second secondary shaft gear 150 and the first tertiary shaft gear 154) and also drives the second tertiary drive shaft 126 (via the engagement between the second secondary shaft gear 150 and the second tertiary shaft gear 156). The rotation of the secondary drive shaft 122 also drives the permanent magnet alternator 70. The rotation of the first tertiary drive shaft 124 drives the hydraulic pump 68, and the rotation of the second tertiary drive shaft 126 drives the fuel control unit 72. The rotation of the quaternary drive shaft 128 drives the first quinary drive shaft 130 (via the engagement between the third quaternary shaft gear 164 and the first quinary shaft gear 170); and drives the second quinary drive shaft 132 (via the engagement between the second quaternary shaft gear 162 and the second quinary shaft gear 172). The rotation of the first quinary drive shaft 130 drives the lubrication pump 74, and the rotation of the second quinary drive shaft 132 drives the DC generator 66. Generally, a diameter of the first tertiary shaft gear 154, the second tertiary shaft gear 156 and the first quinary shaft gear 170 is different, and greater than, a diameter of the second primary shaft gear 142, the second secondary shaft gear 150, the first secondary shaft gear 146, the first quaternary shaft gear 148, the second quaternary shaft gear 162, the third quaternary shaft gear 164 and the second quinary shaft gear 172, which results in the different speeds between the drive shafts 122, 124, 126, 128, 130, 132.

Prior to a start-up of the gas turbine engine 10, the starter valve 84 may direct pressurized air to the starter turbine 64. The starter turbine 64 rotates the primary drive shaft 120, and the engagement between the first primary shaft gear 140 and the gear 58 transmits the torque from the starter turbine 64 to the high pressure driveshaft 46, which causes the high pressure driveshaft 46 to rotate. The rotation of the high pressure driveshaft 46 drives the compressor 32 and the high pressure turbine 38, thereby enabling a start-up of the gas turbine engine 10.

Figure 18:
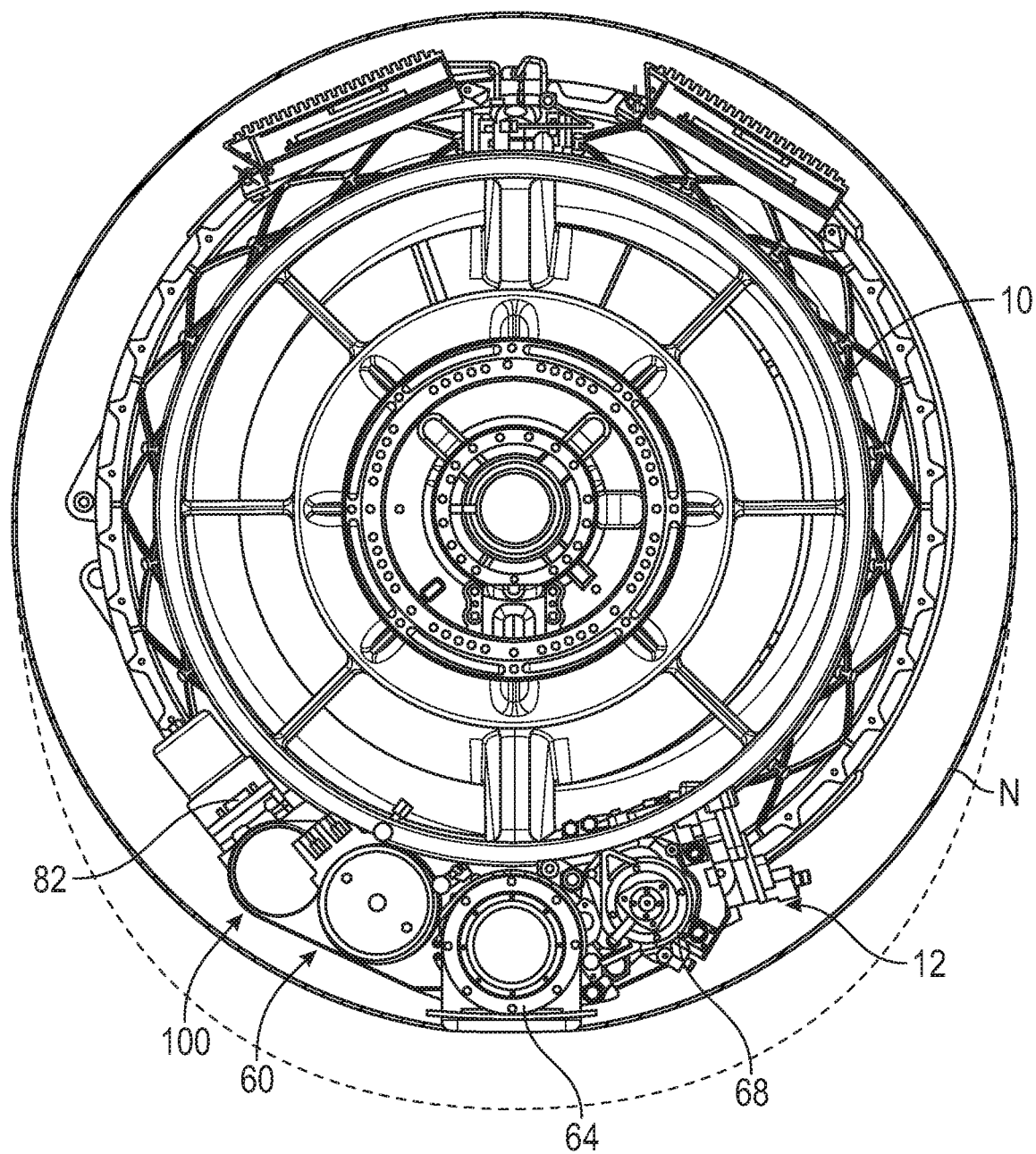
FIG. 18 is a cross-sectional view of the gas turbine engine of FIG. 1, which illustrates that the compact accessory system, including the exemplary compact accessory gearbox, reduces a size of an engine nacelle associated with the gas turbine engine.

With reference to FIG. 18, the accessories 64-82 are orientated both axially and radially about the compact accessory gearbox 60, which enables the compact accessory gearbox 60 to be positioned within an axi-symmetric engine nacelle N. As shown in FIG. 18, the compact accessory gearbox 60 reduces a volume of the engine nacelle N by about 4.00 inches (in.) to about 5.00 inches (in.), when compared to a conventional engine nacelle (a conventionally shaped engine nacelle is shown in a broken line for reference). As shown, the shape of the compact accessory gearbox 60 enables for a reduction in volume of a conventional engine nacelle N by about 2.5 percent.

The ability to employ an axi-symmetric engine nacelle N may reduce the mass associated with fan cowl doors, the inlet surrounding the gas turbine engine 10 and the thrust reducer, due to the reduced size of the engine nacelle N. In addition, due to the shape of the compact accessory gearbox 60, the overall center of gravity of the compact accessory gearbox 60, accessories 64-82, and the oil tank generally sit directly underneath and between the two main mount points or the struts, which provides excellent strength and balance during operation of the gas turbine engine 10. In addition, the inner wall 110 of the gear case 100 may serve as a baffle to prevent oil foaming during the rotation of the gear train 102. The arrangement of the first volume 114 that receives the oil for the gear train 102 also ensures that the gear train 102 receives oil during yaw, pitch and roll maneuvers. In addition, it should be noted that while the various gears 58, 140, 142, 146, 148, 150, 154, 156, 162, 164, 170, 172 are described herein as bevel gears, with a plurality of bevel gear teeth, one or more of the gears 58, 140, 142, 146, 148, 150, 154, 156, 162, 164, 170, 172 may comprise hypoid bevel gears, with hypoid bevel gear teeth.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. An accessory system for a gas turbine engine having a driveshaft with an axis of rotation, the accessory system comprising:
    a towershaft coupled to the driveshaft and rotatable about a towershaft axis of rotation transverse to the axis of rotation of the gas turbine engine, the towershaft including a towershaft bevel gear at a distal end;
    a primary shaft including a first bevel gear and a second bevel gear that each revolve about a primary shaft axis of rotation, the first bevel gear coupled to the towershaft bevel gear to drive the primary shaft;
    a secondary shaft including a third bevel gear and a fourth bevel gear that each revolve about a secondary shaft axis of rotation that is substantially transverse to the primary shaft axis of rotation, the third bevel gear coupled to the second bevel gear to drive the secondary shaft;
    a tertiary shaft including a fifth bevel gear that revolves about a tertiary shaft axis of rotation that is substantially parallel to the primary shaft axis of rotation, the fifth bevel gear coupled to the fourth bevel gear to drive the tertiary shaft; and
    a quaternary shaft including a seventh bevel gear and an eighth bevel gear that each revolve about a quaternary shaft axis of rotation that is substantially transverse to the primary shaft axis of rotation, the seventh bevel gear coupled to the second bevel gear to drive the quaternary shaft.

2. The accessory system of claim 1, wherein the primary shaft is coupled to a first accessory associated with the gas turbine engine, and the primary shaft includes a bearing housing assembly, the bearing housing assembly comprising:
    an accessory mount coupled to the primary shaft and to the accessory, the accessory mount including a lock ring that is movable relative to the accessory mount and the primary shaft to adjust a contact pattern between the towershaft bevel gear and the first bevel gear.

3. The accessory system of claim 1, wherein the primary shaft is coupled to a first accessory associated with the gas turbine engine, and the primary shaft includes a bearing housing assembly, the bearing housing assembly comprising:
    an accessory mount coupled to the primary shaft and to the accessory, the accessory mount including a lock cylinder that is movable relative to the accessory mount and the primary shaft to adjust a contact pattern between the towershaft bevel gear and the first bevel gear.

4. The accessory system of claim 1, further comprising a second tertiary shaft including a sixth bevel gear that revolves about the tertiary shaft axis of rotation, the sixth bevel gear coupled to the fourth bevel gear to drive the second tertiary shaft.

5. The accessory system of claim 1, wherein the tertiary shaft drives a second accessory of the accessory system and the second tertiary shaft drives a third accessory of the accessory system.

6. The accessory system of claim 1, further comprising a quinary shaft including a tenth bevel gear that revolves about a quinary shaft axis of rotation that is substantially transverse to the quaternary shaft axis of rotation, the tenth bevel gear coupled to the eighth bevel gear to drive the quinary shaft.

7. The accessory system of claim 6, wherein the quaternary shaft includes a ninth bevel gear that revolves about the quaternary shaft axis of rotation.

8. The accessory system of claim 7, further comprising a second quinary shaft including an eleventh bevel gear that revolves about the quinary shaft axis of rotation, the eleventh bevel gear coupled to the ninth bevel gear to drive the second quinary shaft.

9. The accessory system of claim 8, wherein the quinary shaft drives a fourth accessory of the accessory system and the quinary shaft drives a fifth accessory of the accessory system.

10. The accessory system of claim 7, wherein the quaternary shaft includes a first end opposite a second end, the seventh bevel gear is coupled at the first end, the ninth bevel gear coupled at the second end, and the tenth bevel gear is coupled to the quaternary shaft between the first end and the ninth bevel gear.

11. The accessory system of claim 1, wherein the secondary shaft axis of rotation and the quaternary shaft axis of rotation intersect each other at a point on the primary shaft axis of rotation.

12. The accessory system of claim 1, wherein the secondary shaft is coupled to a sixth accessory of the accessory system to drive the sixth accessory.

13. An accessory system for a gas turbine engine having a driveshaft with an axis of rotation, the accessory system comprising:
    a towershaft coupled to the driveshaft and rotatable about a towershaft axis of rotation transverse to the axis of rotation of the gas turbine engine, the towershaft including a towershaft bevel gear at a distal end;
    a primary shaft including a first bevel gear and a second bevel gear that each revolve about a primary shaft axis of rotation, the first bevel gear coupled to the towershaft bevel gear to drive the primary shaft;
    a secondary shaft including a third bevel gear and a fourth bevel gear that each revolve about a secondary shaft axis of rotation that is substantially transverse to the primary shaft axis of rotation, the third bevel gear coupled to the second bevel gear to drive the secondary shaft;
    a tertiary shaft including a fifth bevel gear that revolves about a tertiary shaft axis of rotation that is substantially transverse to the secondary shaft axis of rotation, the fifth bevel gear coupled to the fourth bevel gear to drive the tertiary shaft; and
    a quaternary shaft including a sixth bevel gear and a seventh bevel gear that each revolve about a quaternary shaft axis of rotation that is substantially transverse to the primary shaft axis of rotation, the sixth bevel gear coupled to the second bevel gear to drive the quaternary shaft.

14. The accessory system of claim 13, further comprising a second tertiary shaft including an eighth bevel gear that revolves about the tertiary shaft axis of rotation, the eighth bevel gear coupled to the fourth bevel gear to drive the second tertiary shaft.

15. The accessory system of claim 13, further comprising a quinary shaft including a ninth bevel gear that revolves about a quinary shaft axis of rotation that is substantially transverse to the quaternary shaft axis of rotation, the ninth bevel gear coupled to the seventh bevel gear to drive the quinary shaft.

16. The accessory system of claim 15, wherein the quaternary shaft includes a tenth bevel gear that revolves about the quaternary shaft axis of rotation.

17. The accessory system of claim 16, further comprising a second quinary shaft including an eleventh bevel gear that revolves about the quinary shaft axis of rotation, the eleventh bevel gear coupled to the tenth bevel gear to drive the second quinary shaft.

18. The accessory system of claim 13, wherein the primary shaft is coupled to a first accessory associated with the gas turbine engine, and the primary shaft includes a bearing housing assembly, the bearing housing assembly comprising:

an accessory mount coupled to the primary shaft and to the accessory, the accessory mount including a lock cylinder that is movable relative to the accessory mount and the primary shaft to adjust a contact pattern between the towershaft bevel gear and the first bevel gear.

19. An accessory system for a gas turbine engine having a driveshaft with an axis of rotation, the accessory system comprising:

a towershaft coupled to the driveshaft and rotatable about a towershaft axis of rotation transverse to the axis of rotation of the gas turbine engine, the towershaft including a towershaft bevel gear at a distal end;

a primary shaft including a first bevel gear and a second bevel gear that each revolve about a primary shaft axis of rotation, the first bevel gear coupled to the towershaft bevel gear to drive the primary shaft, the primary shaft coupled to a first accessory associated with the gas turbine engine, and the primary shaft includes a bearing housing assembly that includes an accessory mount coupled to the primary shaft and to the accessory, the accessory mount including a lock that is movable relative to the accessory mount and the primary shaft to adjust a contact pattern between the towershaft bevel gear and the first bevel gear;

a secondary shaft including a third bevel gear and a fourth bevel gear that each revolve about a secondary shaft axis of rotation that is substantially transverse to the primary shaft axis of rotation, the third bevel gear coupled to the second bevel gear to drive the secondary shaft; and a tertiary shaft including a fifth bevel gear that revolves about a tertiary shaft axis of rotation that is substantially transverse to the secondary shaft axis of rotation, the fifth bevel gear coupled to the fourth bevel gear to drive the tertiary shaft.

* * * * *